(12) United States Patent
Fukushima

(10) Patent No.: US 10,965,206 B2
(45) Date of Patent: Mar. 30, 2021

(54) STEP-UP/DOWN DC-DC CONVERTER

(71) Applicant: Rohm Co., Ltd., Kyoto (JP)

(72) Inventor: Shun Fukushima, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 15/917,945

(22) Filed: Mar. 12, 2018

(65) Prior Publication Data

US 2018/0262098 A1    Sep. 13, 2018

(30) Foreign Application Priority Data

Mar. 13, 2017 (JP) .............................. JP2017-047424
Mar. 13, 2017 (JP) .............................. JP2017-047426
Feb. 16, 2018 (JP) .............................. JP2018-025608

(51) Int. Cl.
*H02M 3/158* (2006.01)
*H02M 1/08* (2006.01)
(Continued)

(52) U.S. Cl.
CPC .......... *H02M 1/083* (2013.01); *H02M 3/155* (2013.01); *H02M 3/1582* (2013.01);
(Continued)

(58) Field of Classification Search
CPC .......... H02M 1/08; H02M 1/083; H02M 1/32; H02M 3/02; H02M 3/10; H02M 3/145; H02M 3/155; H02M 3/1582; H02M 3/156; H02M 3/157; H02M 3/158; H02M 3/1588; H02M 2001/0009; H02M 2001/0016; H02M 2001/0032; H02M 2001/0035; H02M 2001/0048; H02M 2001/0058; H02M 2001/322; H02M 2003/1552; H02M 2003/1555; H02M 2003/1566; H02M 3/04; H02M 3/135; H02M 3/137; H02M 3/139; H02M 3/142; H02M 3/1563; H02M 1/322; H02M 2001/0054; H02M 2003/1557;
(Continued)

(56) References Cited

U.S. PATENT DOCUMENTS 6,788,033 B2 * 9/2004 Vinciarelli .......... H02M 3/1582
                                                        323/225
7,157,888 B2 * 1/2007 Chen ..................... H02M 3/157
                                                        323/224
(Continued)

FOREIGN PATENT DOCUMENTS

JP      2013-236435      11/2013
JP      2014089560 A  *  5/2014

OTHER PUBLICATIONS

English translation of JP2014089560. (Year: 2014).*

*Primary Examiner* — Thienvu V Tran
*Assistant Examiner* — Carlos O Rivera-Perez
(74) *Attorney, Agent, or Firm* — Fish & Richardson P.C.

(57) ABSTRACT

A switch controller performs first sleep operation, to which a transition from normal operation is made when a light load is detected, and second sleep operation, to which a transition is made after the first sleep operation. In the first sleep operation, a coil current is passed via a body diode of any of a plurality of transistors that is off to an input voltage side or to an output voltage side. In the second sleep operation, a current path from at least one of first and second connection nodes to ground is formed.

5 Claims, 22 Drawing Sheets

(51) Int. Cl.
*H02M 3/155* (2006.01)
*H02M 1/00* (2006.01)

(52) U.S. Cl.
CPC ............... *H02M 2001/0032* (2013.01); *H02M 2001/0058* (2013.01); *Y02B 70/10* (2013.01)

(58) Field of Classification Search
CPC .... Y02B 70/10; Y02B 70/14; Y02B 70/1458; Y02B 70/1466; Y02B 70/1491; Y02B 70/16
USPC ....... 323/222–226, 234, 235, 259, 265, 266, 323/271–277, 282–286, 351; 363/123–127
See application file for complete search history.

(56) References Cited

U.S. PATENT DOCUMENTS

| | | | |
|---|---|---|---|
| 2006/0164057 A1* | 7/2006 | Kudo | H02M 3/1588 323/282 |
| 2010/0148741 A1* | 6/2010 | Chen | H02M 3/158 323/285 |
| 2016/0276853 A1* | 9/2016 | Meng | H02M 1/32 |

* cited by examiner

STEP-UP/DOWN DC-DC CONVERTER

This application is based on Japanese Patent Applications Nos. 2017-47424 (filed on Mar. 13, 2017), 2017-47426 (filed on Mar. 13, 2017), and 2018-25608 (filed on Feb. 16, 2018), the contents of all of which are hereby incorporated by reference.

BACKGROUND OF THE INVENTION

1. Field of the Invention

The present invention relates to step-up/down DC-DC converters.

2. Description of Related Art

There are conventionally known DC-DC converters that can step a voltage both up and down. One configuration example of such conventional step-up/down DC-DC converters is shown in FIG. 26.

The conventional step-up/down DC-DC converter 100 shown in FIG. 26 includes a first high-side transistor H1, which is a p-channel MOSFET; a first low-side transistor L1, which is an n-channel MOSFET; a second high-side transistor H2, which is a p-channel MOSFET; a second low-side transistor L2, which is an n-channel MOSFET; an output capacitor C1; a switch controller 105; and a coil 110.

The source of the first high-side transistor H1 is connected to a terminal to which an input voltage VIN is applied, and the drain of the first high-side transistor H1 is connected to the drain of the first low-side transistor L1. The source of the first low-side transistor L1 is connected to ground. Thus, the first high-side transistor H1 and the first low-side transistor L1 are connected in series between the input voltage VIN and ground.

The source of the second high-side transistor H2 is connected to one end of the output capacitor C1. The other end of the output capacitor C1 is connected to ground. The drain of the second high-side transistor H2 is connected to the drain of the second low-side transistor L2. The source of the second low-side transistor L2 is connected to ground.

One end of the coil 110 is connected to a first connection node N1 at which the first high-side transistor H1 and the first low-side transistor L1 are connected together. The other end of the coil 110 is connected to a second connection node N2 at which the second high-side transistor H2 and the second low-side transistor L2 are connected together. The source of the second high-side transistor H2 and one end of the output capacitor C1 are connected to an output terminal T1. At the output terminal T1, an output voltage VOUT appears. To the output terminal T1, a load is connected, so that an output current TOUT flows through the load.

The switch controller 105 applies voltages to the gates of the first high-side transistor H1, the first low-side transistor L1, the second high-side transistor H2, and the second low-side transistor L2 respectively, and thereby controls the on/off states of those transistors.

In the step-up/down DC-DC converter 100 configured as described above, in step-down operation, where the input voltage VIN>the output voltage VOUT, while the second high-side transistor H2 is held on and the second low-side transistor L2 is held off, the first high-side transistor H1 and the first low-side transistor L1 are switched complementarily (exclusively). In the present specification, the term "complementarily (exclusively)" covers not only operation where the on/off timing of two switches is completely reversed but also operation where, with a view to preventing a through current, the on/off timing of two switches is so controlled as to leave periods (dead time) in which they are both off.

On the other hand, in step-up operation, where the input voltage VIN<the output voltage VOUT, while the first high-side transistor H1 is held on and the first low-side transistor L1 is held off, the second high-side transistor H2 and the second low-side transistor L2 are switched complementarily (exclusively).

That is, the first high-side transistor H1 and the first low-side transistor L1 constitute a step-down switch set, and the second high-side transistor H2 and the second low-side transistor L2 constitute a step-up switch set.

An example of documents related to the prior-art technology discussed above is seen in Japanese Patent Application published as No. 2013-236435.

Here, in the case of the step-up/down DC-DC converter 100 as described above, irrespective of whether in step-down or step-up operation, when the load is light, it can occur that, during the ordinary switching operation of the individual transistors (hereinafter normal operation), the current that passes through the coil 110, that is, the coil current IL, flows backward in the negative direction (the positive direction is assumed to be the direction pointing from the preceding stage to the succeeding stage). This causes a backflow out of the output capacitor C1, and leads to diminished efficiency.

One solution is to shift, on detecting the load being light, the switching operation from normal operation to sleep operation. This helps improve efficiency. A light load can be detected by monitoring the coil current; thus one possible method of control is to shift the switching operation on detecting the point at which the coil current IL shifts from the positive to the negative direction.

Here, FIG. 27 is a timing chart showing an example of control performed, in step-down operation with a light load, to shift from normal operation to sleep operation. FIG. 27 depicts, from the topmost row down, the coil current IL, the voltage appearing at the first connection node N1 referred to as the first switching voltage SW1, the voltage appearing at the second connection node N2 referred to as the second switching voltage SW2, the on/off state of the first high-side transistor H1, the on/off state of the first low-side transistor L1, the on/off state of the second high-side transistor H2, and the on/off state of the second low-side transistor L2.

As shown in FIG. 27, in normal operation (WAKE UP), while the second high-side transistor H2 is held on and the second low-side transistor L2 is held off, the first high-side transistor H1 is turned on and the first low-side transistor L1 is turned off. This causes a positive-direction coil current IL to increase. Then, the first high-side transistor H1 is turned off and the first low-side transistor L1 is turned on. This causes the positive-direction coil current IL to decrease. Then, the switch controller 105 detects the coil current IL shifting from the positive direction to the negative direction (that is a zero cross). Now, the switch controller 105 shifts modes from normal operation to sleep operation (SLEEP), and turns off all of the four transistors.

In this way, the coil current IL is prevented from flowing backward in the negative direction, and this helps suppress a drop in efficiency. A zero cross in the coil current IL can be detected by monitoring the drain-source voltage of the first low-side transistor L1.

Inconveniently, zero cross detection in the coil current IL can take place early or late. When zero cross detection is early, on transition to sleep operation, a positive-direction coil current IL remains. In this case, since all the transistors are off, the coil current IL flows along a path via the body diode of the first low-side transistor L1, the coil 110, and the body diode of the second high-side transistor H2, and is regenerated to the output voltage VOUT side.

On the other hand, when zero cross detection is late, on transition to sleep operation, a negative-direction coil current IL remains. In this case, since all the transistors are off, the coil current IL flows along a path via the body diode of the second low-side transistor L2, the coil 110, and the body diode of the first high-side transistor H1, and is regenerated to the input voltage VIN side.

Thus, no matter how zero cross detection deviates, the current is regenerated, and thus hardly any loss of power occurs.

However, holding all the transistors off in sleep operation has a disadvantage: if a leak current occurs along a path from the input voltage VIN via the first high-side transistor H1, the coil 110, and the second high-side transistor H2 to the output voltage VOUT in this order, a rise occurs in the output voltage VOUT.

Here, FIG. 28 is a timing chart showing an example of control performed, in step-down operation with a light load, to shift from normal operation to sleep operation by a different method compared with that in FIG. 27. In the control of FIG. 28, when shifting to sleep operation takes place, the high-side transistors are both turned off, and low-side transistors are both turned on.

Thus, even if a leak current that flows from the input voltage VIN via the first high-side transistor H1 occurs, the leak current flows via the first low-side transistor L1 to the ground side. This helps avoid a rise in the output voltage VOUT.

However, if zero cross detection in the coil current IL is early or late and the coil current IL remains in either of the directions, the remaining current continues flowing along a loop path via the first low-side transistor L1, the second low-side transistor L2, and the coil 110. Then, disadvantageously, the on-resistances of the transistors and the resistance component (DCR) of the coil 110 cause power loss.

Against the background discussed above, an object of the present invention is to provide a step-up/down DC-DC converter that can, under a light-load condition, suppress power loss and suppress a rise in the output voltage due to a leak current.

SUMMARY OF THE INVENTION

According to a first aspect of the present invention, a step-up/down DC-DC converter includes: a step-down switch set which includes a connected arrangement of a first high-side transistor and a first low-side transistor and to which an input voltage is applied; a step-up switch set which includes a connected arrangement of a second high-side transistor and a second low-side transistor and which outputs an output voltage; a coil which connects between a first connection node in the step-down switch set and a second connection node in the step-up switch set; and a switch controller which is configured to control the switching of the transistors in the step-down and step-up switch sets. The switch controller performs first sleep operation, to which a transition from normal operation is made when a light load is detected, and second sleep operation, to which a transition is made after the first sleep operation. In the first sleep operation, a coil current is passed via the body diode of any of the transistors that is off to the input voltage side or to the output voltage side. In the second sleep operation, a current path from at least one of the first and second connection nodes to ground is formed.

According to a second aspect of the present invention, a step-up/down DC-DC converter includes: a first connected arrangement which is composed of a first high-side transistor and a first diode or a first low-side transistor and to which an input voltage is applied; a second connected arrangement which is composed of a second diode or a second high-side transistor and a second low-side transistor and which outputs an output voltage; a coil which connects between a first connection node in the first connected arrangement and a second connection node in the second connected arrangement; and a switch controller which is configured to control the switching of the transistors in the first and second connected arrangements. At least one of the first and second diodes is provided. The switch controller performs first sleep operation, to which a transition from normal operation is made when a light load is detected, and second sleep operation, to which a transition is made after the first sleep operation. In the first sleep operation, at least the second and first low-side transistors are held off. In the second sleep operation, a current path from at least one of the first and second connection nodes to ground is formed.

According to a third aspect of the present invention, a step-up/down DC-DC converter includes: a step-down switch set which includes a connected arrangement of a first high-side transistor and a first low-side transistor and to which an input voltage is applied; a step-up switch set which includes a connected arrangement of a second high-side transistor and a second low-side transistor and which outputs an output voltage; a coil which connects between a first connection node in the step-down switch set and a second connection node in the step-up switch set; a resistor and a switch which are arranged in a path from at least one of the first and second connection nodes to ground; and a switch controller which is configured to control the switching of the transistors in the step-down and step-up switch sets and of the switch. The switch controller performs sleep operation, to which a transition from normal operation is made when a light load is detected. In the sleep operation, a coil current is passed via the body diode of any of the transistors that is off to the input voltage side or to the output voltage side. In the sleep operation, the switch is held on.

According to a fourth aspect of the present invention, a step-up/down DC-DC converter includes: a first connected arrangement which is composed of a first high-side transistor and a first diode or a first low-side transistor and to which an input voltage applied; a second connected arrangement which is composed of a second diode or a second high-side transistor and a second low-side transistor and which outputs an output voltage; a coil which connects between a first connection node in the first connected arrangement and a second connection node in the second connected arrangement; a resistor and a switch which are arranged in a path from at least one of the first and second connection nodes to ground; and a switch controller which is configured to control the switching of the transistors in the first and second connected arrangements and of the switch. At least one of the first and second diodes is provided. The switch controller performs sleep operation, to which a transition from normal operation is made when a light load is detected. In the sleep operation, a coil current is passed via at least one of the first and second diodes to the output voltage side. In the sleep operation, the switch is held on.

DETAILED DESCRIPTION OF PREFERRED EMBODIMENTS

Hereinafter, embodiments of the present invention will be described with reference to the accompanying drawings.

1.First Embodiment

Figure 1:
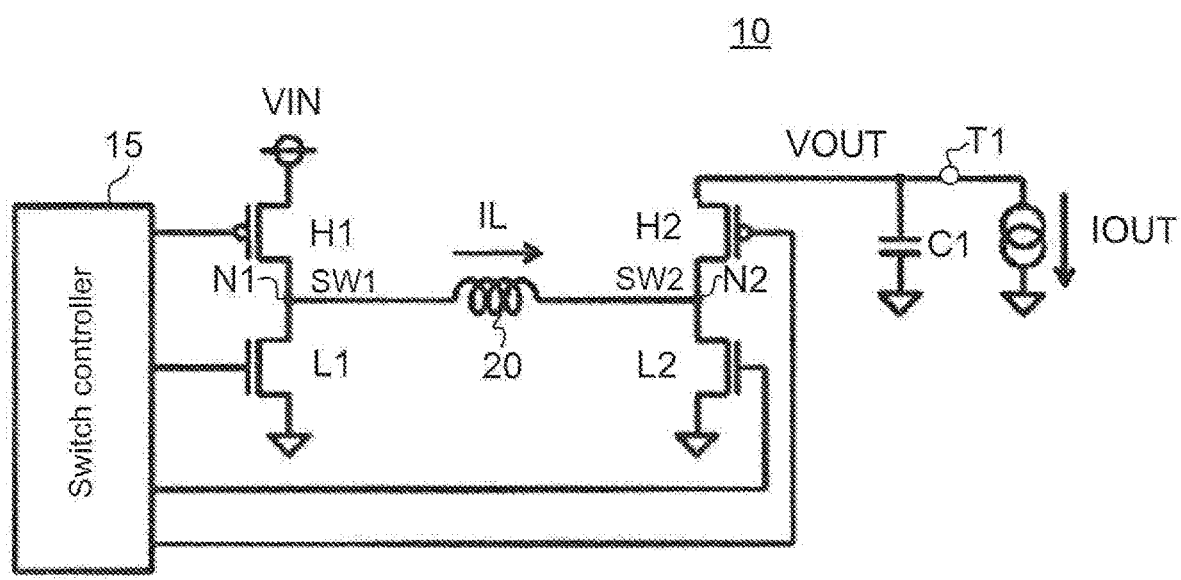
FIG. 1 is a circuit diagram showing one configuration example of a step-up/down DC-DC converter.

FIG. 1 shows a configuration of a step-up/down DC-DC converter according to one embodiment of the present invention. The configuration of the step-up/down DC-DC converter 10 of FIG. 1 is similar to the configuration shown in FIG. 26 and described earlier, and therefore no overlapping description will be repeated. The following description focuses on a method of sleep operation as a principal feature of the present invention. It is assumed that the agent of various kinds of switching control as well as zero-cross detection in a coil current IL is a switch controller 15.

Figure 2:
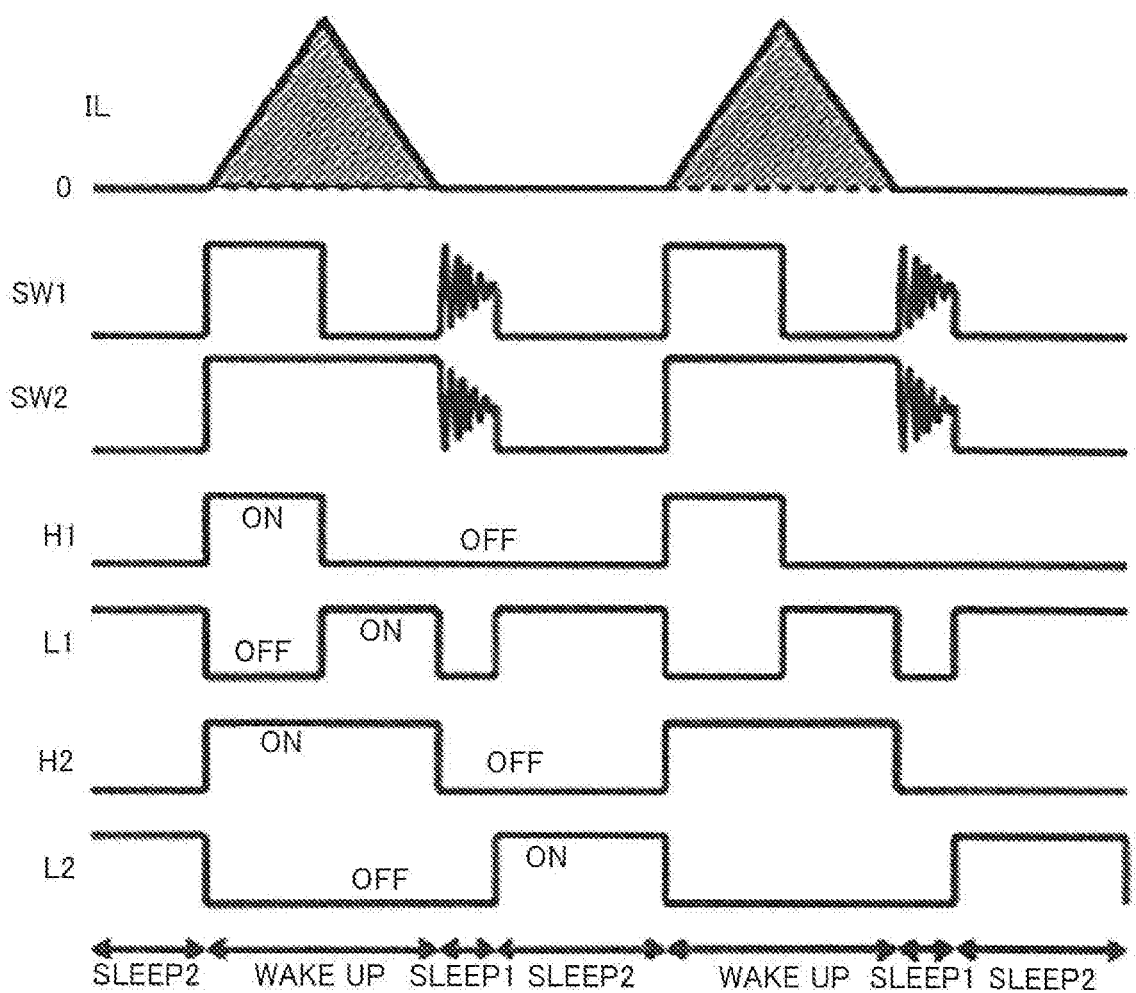
FIG. 2 is a timing chart showing an example of control performed, in step-down operation with a light load, to shift from normal operation to sleep operation according to one embodiment of the present invention.

1-1. Basic Embodiment of Sleep Operation: Here, a basic embodiment of the sleep operation performed in the step-up/down DC-DC converter 10 will be described. FIG. 2 is a timing chart showing an example of control performed, in step-down operation with a light load, to shift from normal operation to sleep operation according to this embodiment.

As shown in FIG. 2, in this embodiment, the coil current IL increases and decreases in normal operation (WAKE UP), and when a zero cross is detected in the coil current IL, shifting from normal operation to sleep operation takes place. Specifically, first a transition is made to first sleep operation (SLEEP1), and then a transition is made to second sleep operation (SLEEP2).

Figure 3:
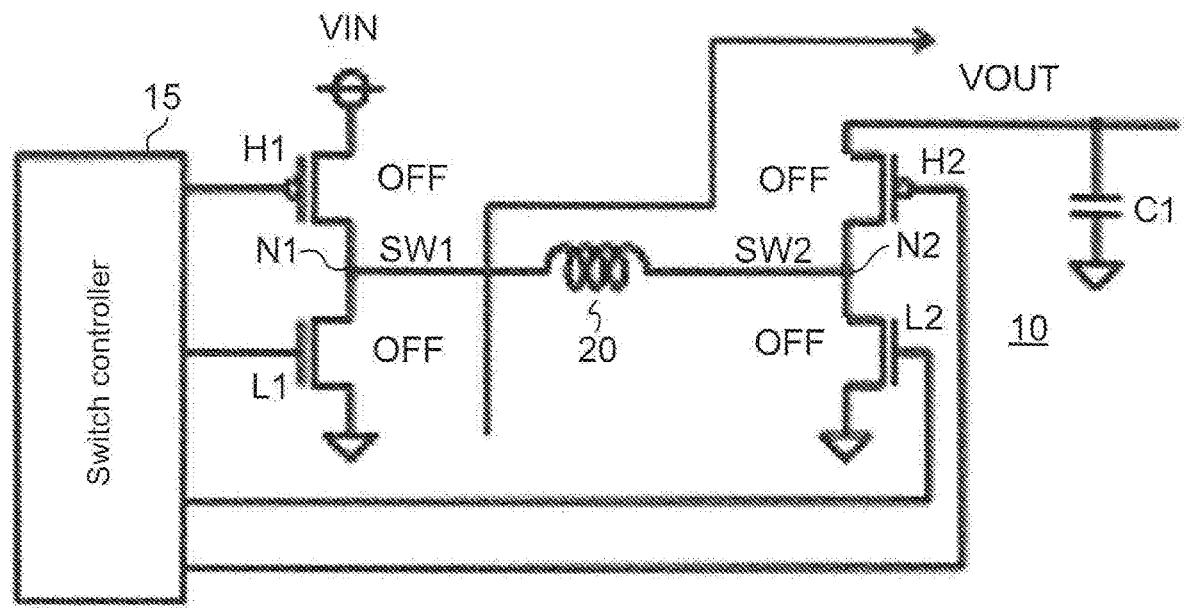
FIG. 3 is a diagram showing a switching pattern and a path of a coil current (positive direction) in first sleep operation according to one embodiment.
Figure 4:
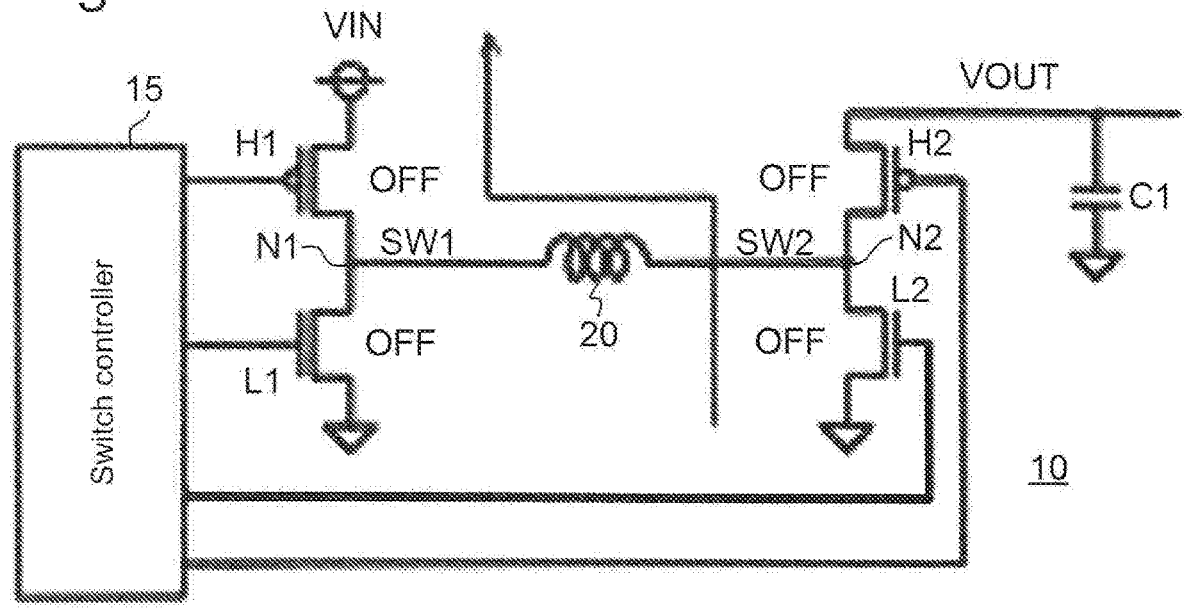
FIG. 4 is a diagram showing a switching pattern and a path of a coil current (negative direction) in first sleep operation according to one embodiment.

On transition to the first sleep operation, the four transistors in the step-up/down DC-DC converter 10 are turned off. At this time, when zero cross detection is early, and a positive-direction coil current IL remains, then, as shown in FIG. 3, the coil current IL flows along a path via the body diode of the first low-side transistor L1, the coil 20, and the body diode of the second high-side transistor H2 in this order, and is regenerated to the output voltage VOUT side. On the other hand, when zero cross detection is late, and a negative-direction coil current IL remains, then, as shown in FIG. 4, the coil current IL flows along a path via the body diode of the second low-side transistor L2, the coil 20, and the body diode of the first high-side transistor H1 in this order, and is regenerated to the input voltage VIN side.

In this way, no matter in which direction zero cross detection deviates, the current is regenerated to the output voltage VOUT side or to the input voltage VIN side, and this helps suppress power loss.

As shown in FIG. 2, at the lapse of a predetermined period from the transition to the first sleep operation, the transition to the second sleep operation takes place. On transition to the second sleep operation, the two high-side transistors are turned off, and the two low-side transistors are turned on.

Figure 5:
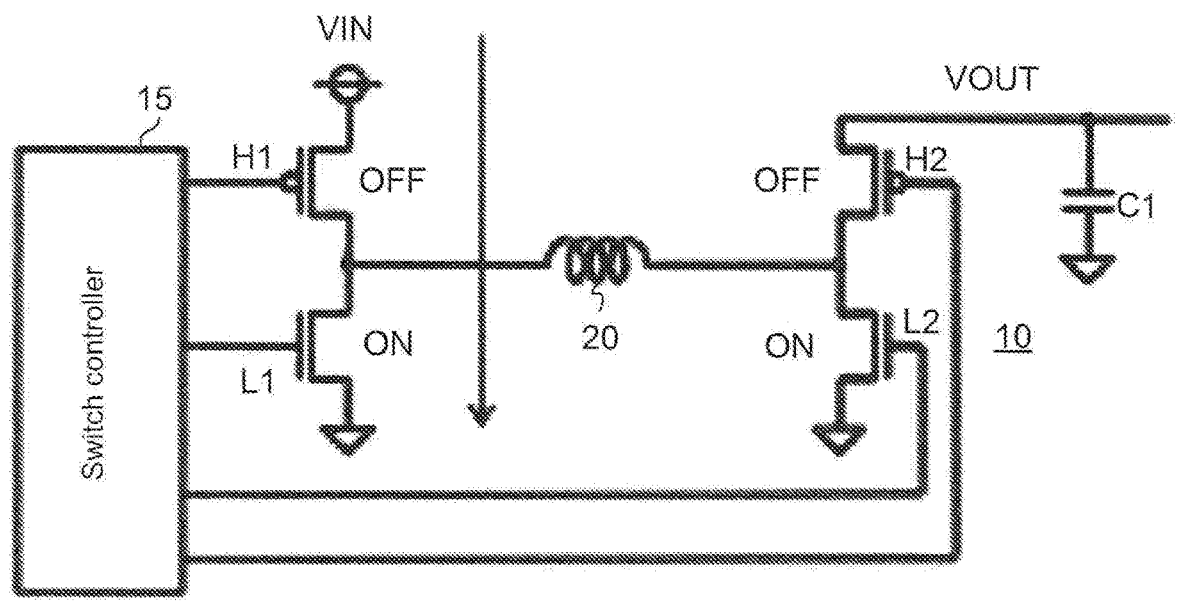
FIG. 5 is a diagram showing a switching pattern and a path of a leak current in second sleep operation according to one embodiment.

At this time, as shown in FIG. 5, if a leak current that flows from the input voltage VIN side via the first high-side transistor H1 occurs, the leak current flows via the first low-side transistor L1, which is now on, to ground. This helps suppress a rise in the output voltage VOUT resulting from the leak current flowing to the output voltage VOUT side.

As described above, with the sleep operation according to this embodiment, even when zero cross detection in the coil current deviates, it is possible to suppress power loss, and to suppress a rise in the output voltage due to a leak current.

Figure 6:
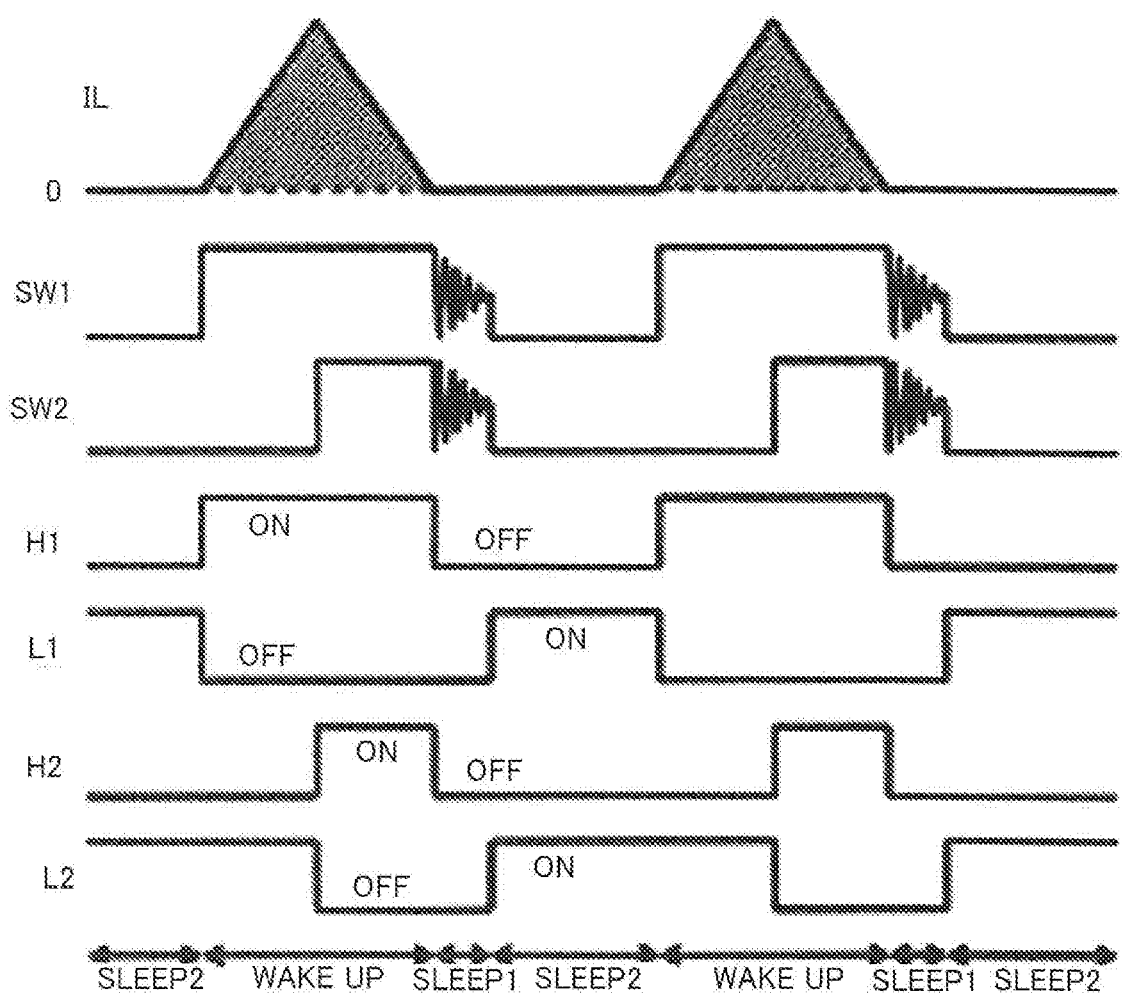
FIG. 6 is a timing chart showing an example of control performed, in step-up operation with a light load, to shift from normal operation to sleep operation according to one embodiment of the present invention.

As shown in FIG. 6, also in step-up operation with a light load, sleep operation similar to that in step-down operation described above can be performed. Specifically, according to this embodiment, irrespective of which of the input voltage VIN and the output voltage VOUT is higher, similar sleep operation can be performed, and similar effects can be obtained.

1-2. Modified Example of 1st Sleep Operation: The first sleep operation is not limited to that described above, but may be modified as described below. The first sleep operation of the modified example here shifts control between in step-down operation and step-up operation.

Figure 7:
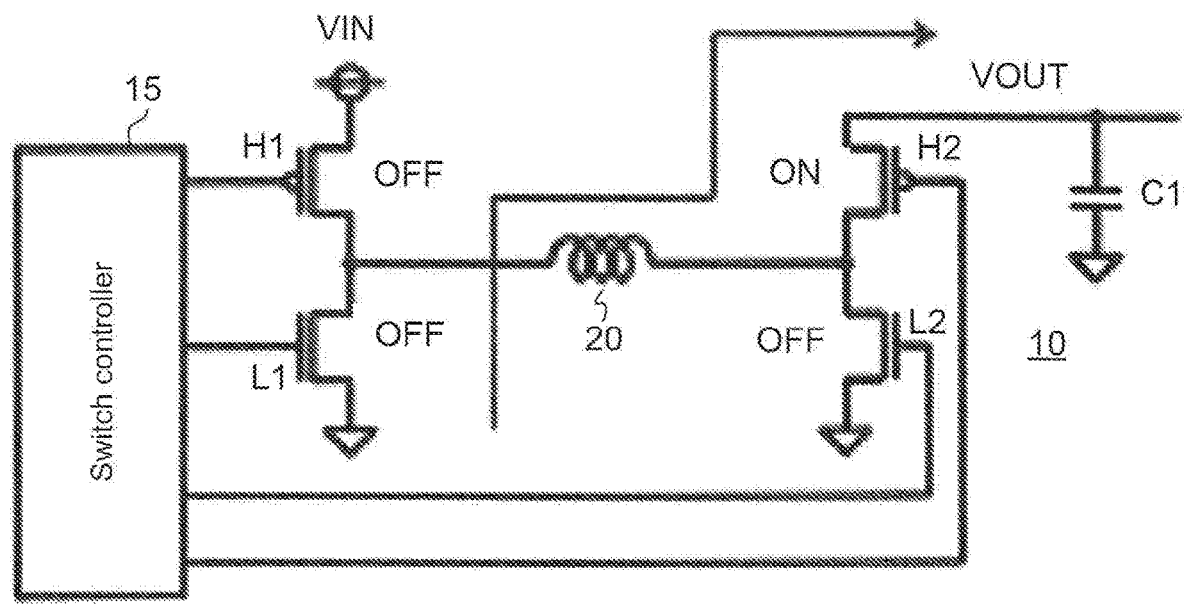
FIG. 7 is a diagram showing a switching pattern and a path of a coil current (positive direction) in first sleep operation according to a modified example (in step-down operation)
Figure 8:
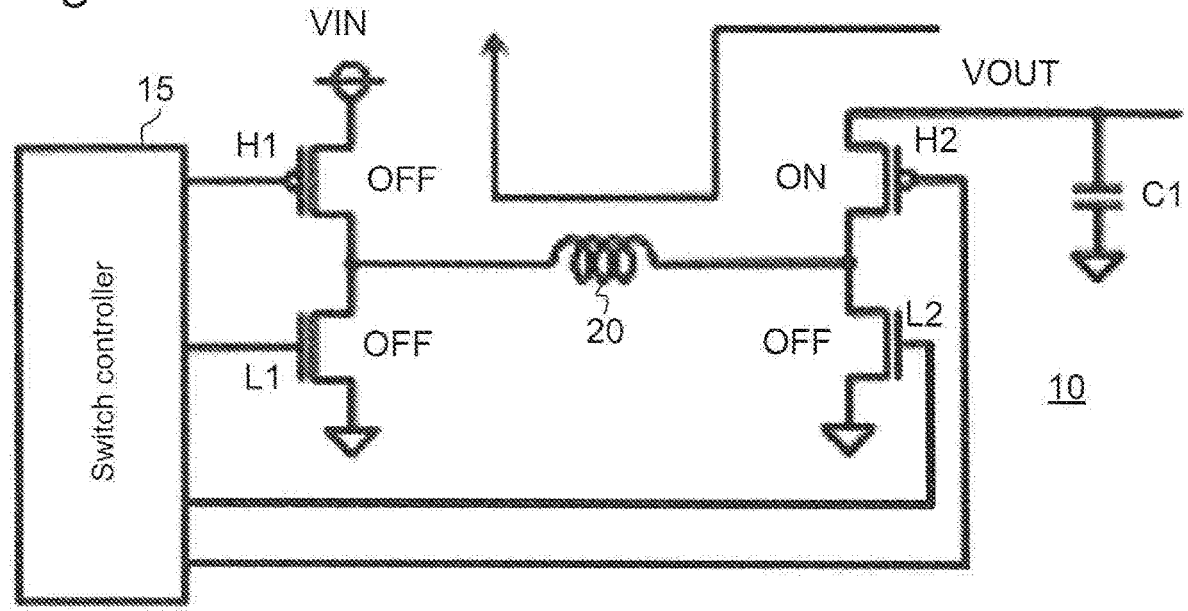
FIG. 8 is a diagram showing a switching pattern and a path of a coil current (negative direction) in first sleep operation according to a modified example (in step-down operation)

Specifically, in step-down operation, where the input voltage VIN>the output voltage VOUT, as shown in FIGS. 7 and 8, the second high-side transistor H2 is held on, and the other transistors are held off.

In this case, when zero cross detection in the coil current IL is early, and a positive-direction coil current IL remains, then, as shown in FIG. 7, the coil current IL flows along a path via the body diode of the first low-side transistor L1, the coil 20, and the channel of the second high-side transistor H2 in this order, and is regenerated to the output voltage VOUT side. On the other hand, when zero cross detection is late, and a negative-direction coil current IL remains, then, as shown in FIG. 8, the coil current IL flows from the output voltage VOUT side along a path via the channel of the second high-side transistor H2, the coil 20, and the body diode of the first high-side transistor H1 in this order, and is regenerated to the input voltage VIN side.

Figure 9:
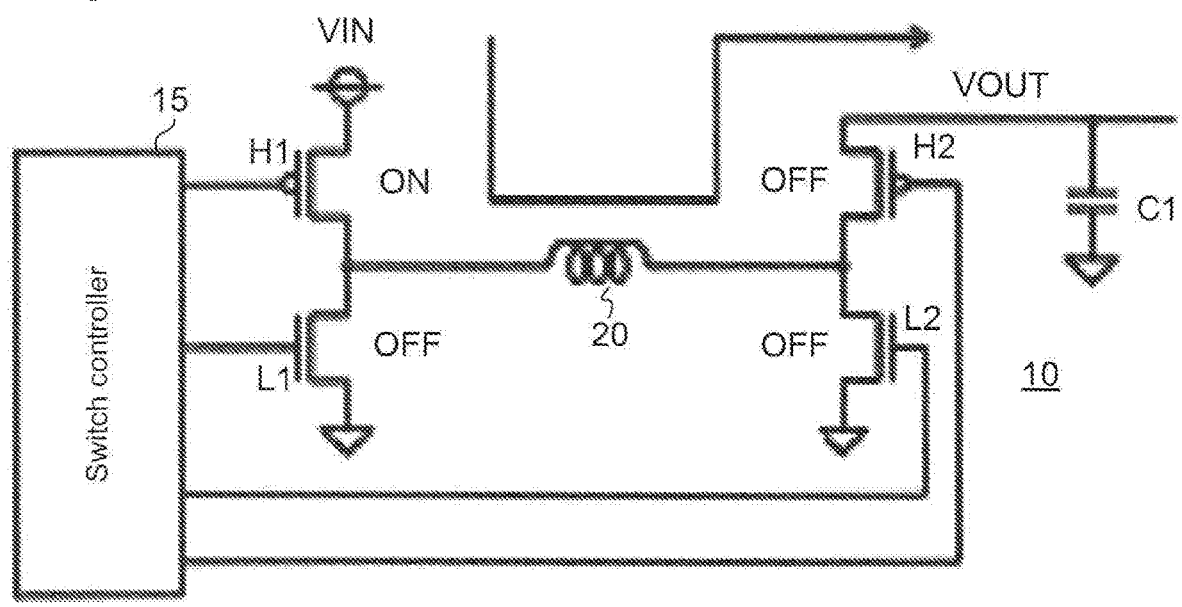
FIG. 9 is a diagram showing a switching pattern and a path of a coil current (positive direction) in first sleep operation according to a modified example (in step-up operation)
Figure 10:
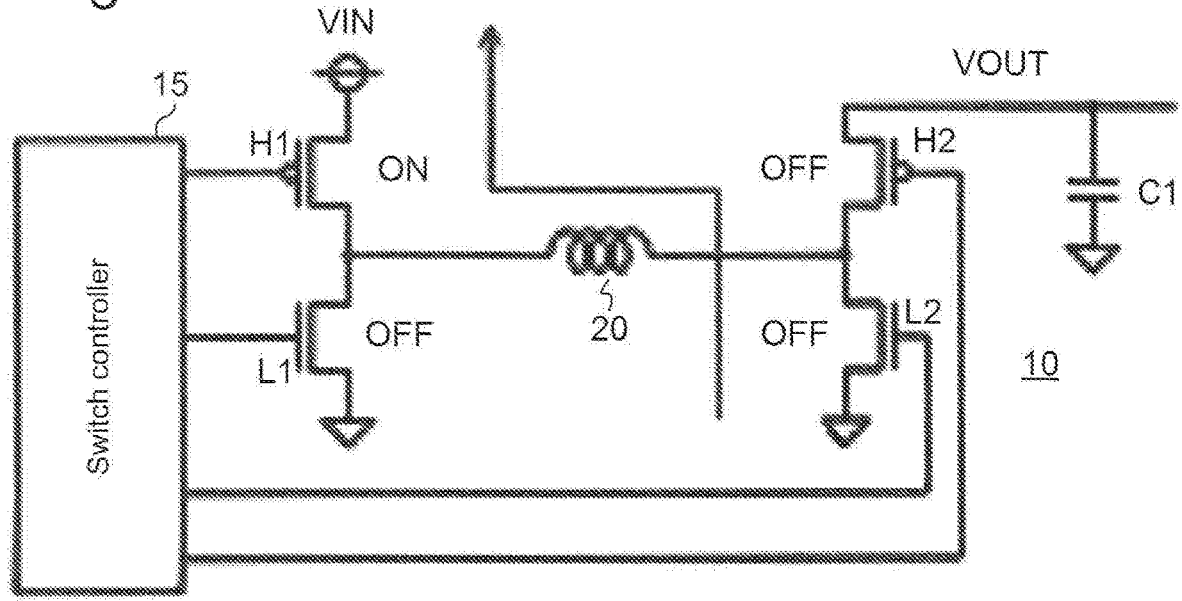
FIG. 10 is a diagram showing a switching pattern and a path of a coil current (negative direction) in first sleep operation according to a modified example (in step-up operation)

By contrast, in step-up operation, where the input voltage VIN<the output voltage VOUT, as shown in FIGS. 9 and 10, the first high-side transistor H1 is held on, and the other transistors are held off.

In this case, when zero cross detection in the coil current IL is early, and a positive-direction coil current IL remains, then, as shown in FIG. 9, the coil current IL flows from the input voltage VIN side along a path via the channel of the first high-side transistor H1, the coil 20, and the body diode of the second high-side transistor H2 in this order, and is regenerated to the output voltage VOUT side. On the other hand, when zero cross detection is late, and a negative-direction coil current IL remains, then, as shown in FIG. 10, the coil current IL flows along a path via the body diode of the second low-side transistor L2, the coil 20, and the channel of the first high-side transistor H1 in this order, and is regenerated to the input voltage VIN side.

As described above, also with the first sleep operation of this modified example, even when zero cross detection in the coil current deviates, the current is regenerated to the input voltage VIN side or to the output voltage VOUT side, and thus it is possible to suppress power loss.

Figure 11:
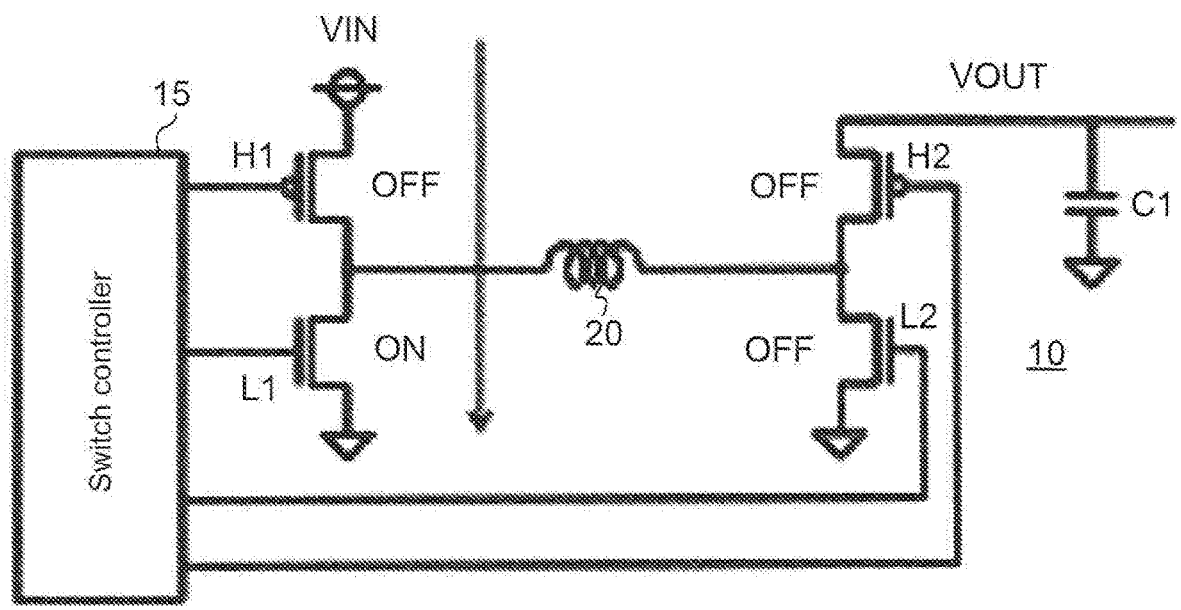
FIG. 11 is a diagram showing a switching pattern and a path of a leak current in second sleep operation according to a modified example.

1-3. Modified Example of 2nd Sleep Operation: The second sleep operation may be, instead of what is described just above, as described below. For example, as shown in FIG. 11, in the second sleep operation, the first low-side transistor L1 may be held on, and the other transistors may be held off. In this case, if a leak current that flows from the input voltage VIN side via the first high-side transistor H1 occurs, the leak current flows via the first low-side transistor L1, which is now on, to ground. This helps suppress a rise in the output voltage VOUT resulting from the leak current flowing to the output voltage VOUT side.

Figure 12:
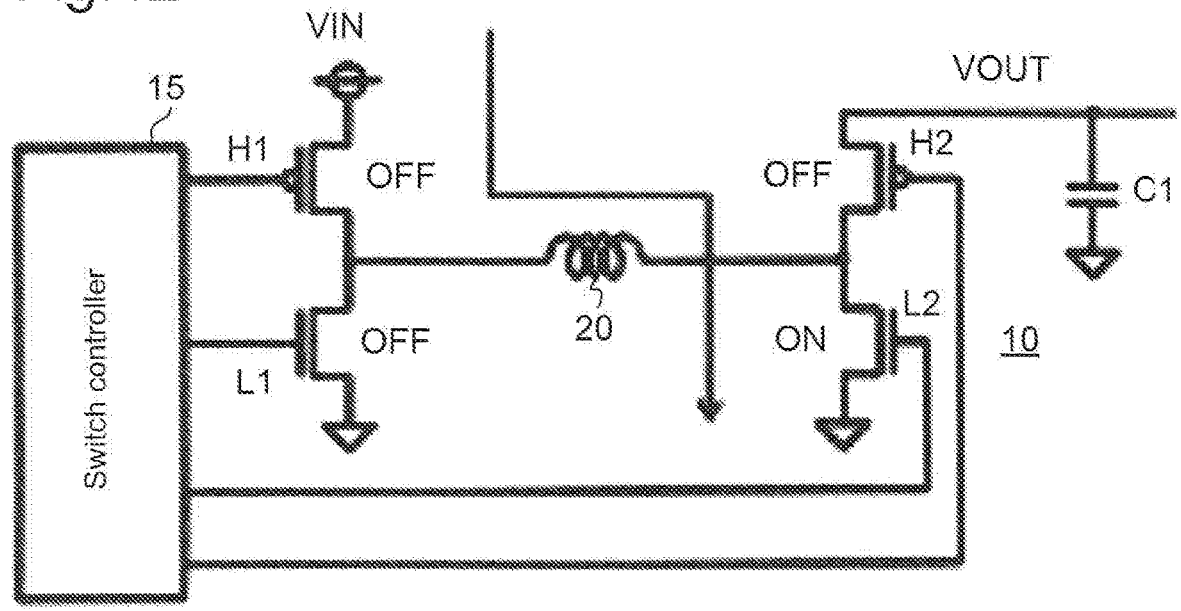
FIG. 12 is a diagram showing a switching pattern and a path of a leak current in second sleep operation according to another modified example.

Instead, as shown in FIG. 12, in the second sleep operation, the second low-side transistor L2 may be held on, and the other transistors may be held off. In that case, if a leak current that flows from the input voltage VIN side via the first high-side transistor H1 occurs, the leak current flows via the coil 20 and the second low-side transistor L2, which is now on, to ground. This helps suppress a rise in the output voltage VOUT resulting from the leak current flowing to the output voltage VOUT side.

In the first sleep operation that is performed before the second sleep operation, both of the low-side transistors are held off. Thus, in the second sleep operation, the operation shown in FIGS. 11 and 12, where one of the low-side transistors is held off, permits the off state to be maintained and thus requires no shifting of switching.

1-4. Timing of Transition from 1st to 2nd Sleep Operation: As mentioned above, at the lapse of a predetermined period from the transition to the first sleep operation, the transition to the second sleep operation takes place. Here, the predetermined period will be discussed.

Figure 13:
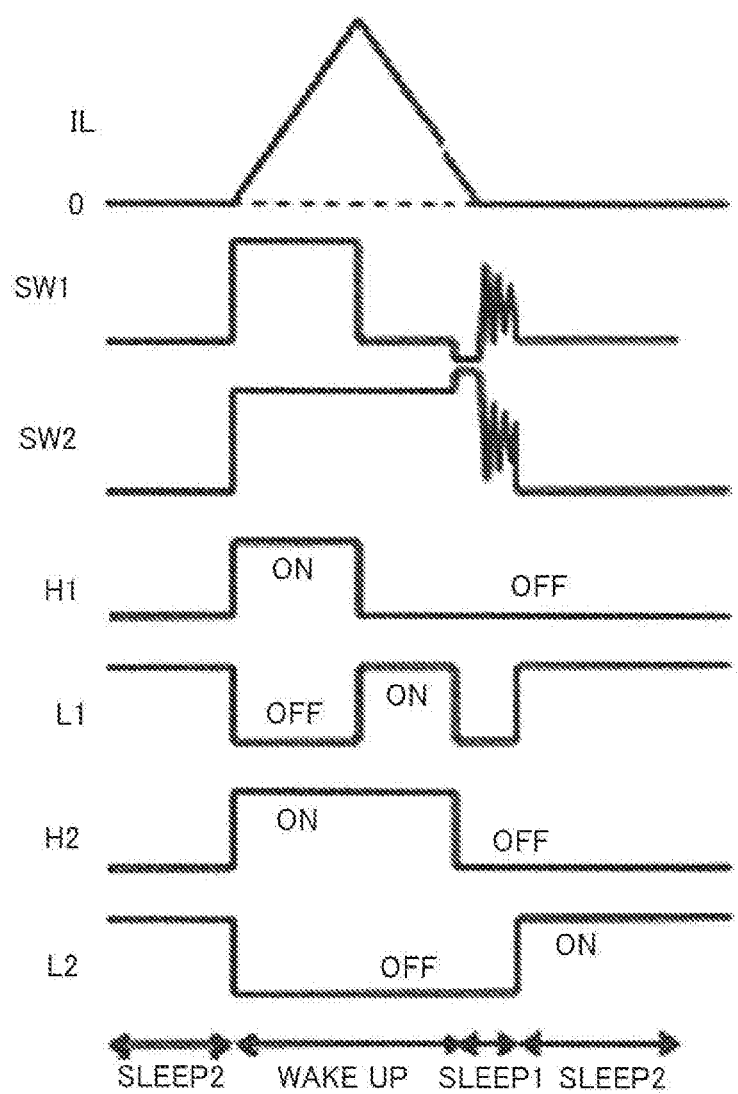
FIG. 13 is a timing chart showing one example of a case where zero cross detection in a coil current is early in step-down operation.

FIG. 13 is a timing chart showing an example of a case where, in the step-up/down DC-DC converter 10 (FIG. 1), zero cross detection in the coil current IL is early in step-down operation. In this case, the transition from normal operation to the first sleep operation takes place with a positive-direction coil current IL remaining.

In that case, as shown in FIG. 3, in the first sleep operation, all the transistors are held off, and a current flows via the body diodes of the transistors; thus the voltage appearing at the first connection node N1 referred to as the first switching voltage SW1 becomes lower than ground, and the voltage appearing at the second connection node N2 referred to as the second switching voltage SW2 becomes higher than the output voltage VOUT.

Thereafter, when the coil current IL becomes zero, the parasitic capacitances at the first and second connection nodes N1 and N2 respectively and the coil 20 cause resonance, and the first and second voltages SW1 and SW2 oscillate. It is thus preferable that the period from the transition to the first sleep operation to the occurrence of the oscillation of the first and second voltages SW1 and SW2 be set as the above-mentioned predetermined period beforehand. This makes it possible to wait for the coil current IL to become zero and then make the transition to the second sleep operation.

Figure 14:
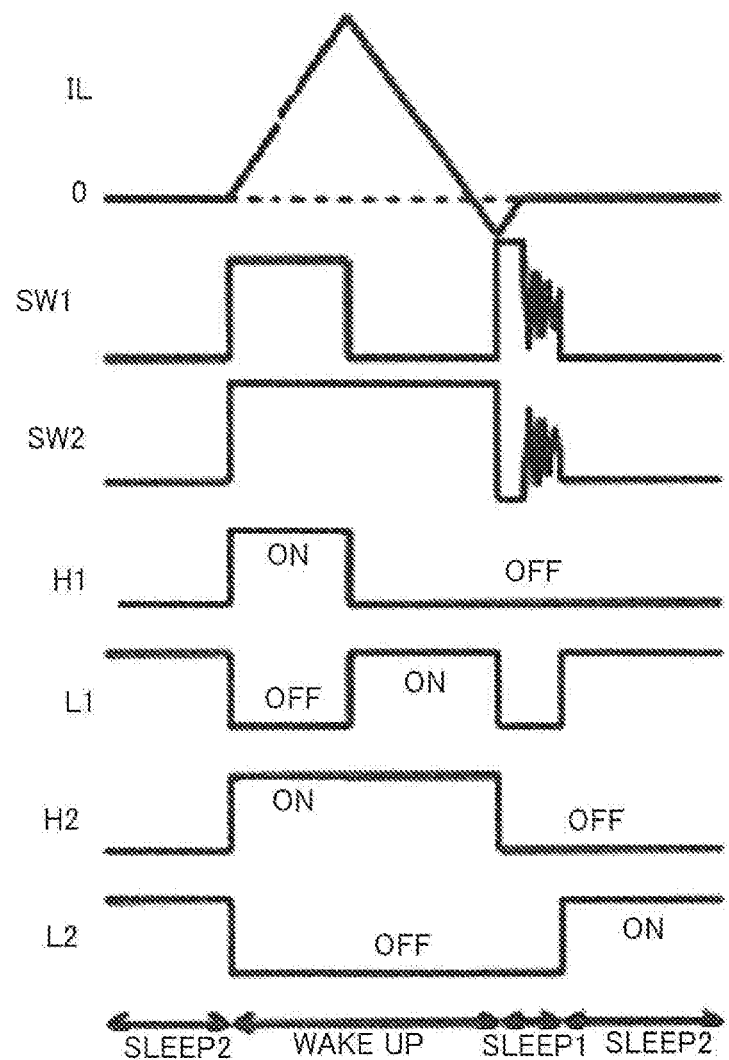
FIG. 14 is a timing chart showing one example of a case where zero cross detection in a coil current is late in step-down operation.

Similarly, FIG. 14 is a timing chart showing an example of a case where, in the step-up/down DC-DC converter 10, zero cross detection in the coil current IL is late in step-down operation. In this case, the transition from normal operation to the first sleep operation takes place with a negative-direction coil current IL remaining.

In that case, as shown in FIG. 4, in the first sleep operation, all the transistors are held off, and a current flows via the body diodes of the transistors; thus the first switching voltage SW1 becomes higher than the input voltage VIN, and the second switching voltage SW2 becomes lower than ground.

Thereafter, when the coil current IL becomes zero, as in the case described above, resonance occurs, and the first and second voltages SW1 and SW2 oscillate. Accordingly, it is preferable that the above-mentioned predetermined period be set as described above.

Figure 15:
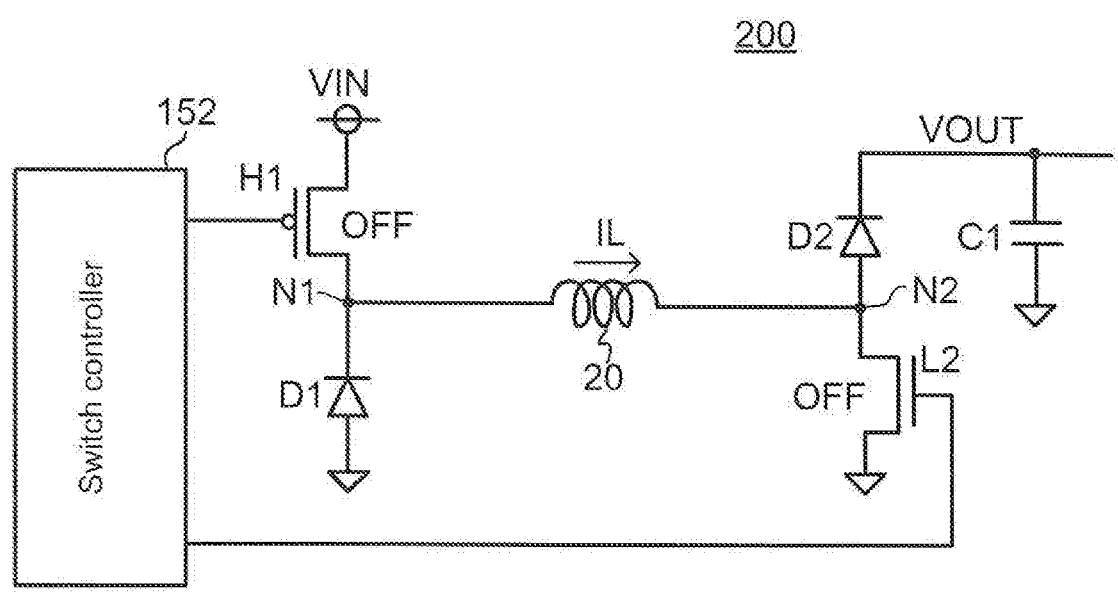
FIG. 15 is a diagram showing a switching pattern in first sleep operation in a diode-rectifying step-up/down DC-DC converter.

1-5. Diode-Rectifying Step-Up/Down DC-DC Converter:

Here, an embodiment employing a diode-rectifying step-up/down DC-DC converter will be described. FIG. 15 is a diagram showing a configuration of a diode-rectifying step-up/down DC-DC converter 200 according to one embodiment of the present invention. The step-up/down DC-DC converter 200 includes a high-side transistor H1, a diode D1, a coil 20, a diode D2, a low-side transistor L2, an output capacitor C1, and a switch controller 152.

The source of the high-side transistor H1 is connected to a terminal to which the input voltage VIN is applied. The drain of the high-side transistor H1 is connected to the cathode of the diode D1. The anode of the diode D1 is connected to ground.

The source of the low-side transistor L2 is connected to ground. The drain of the low-side transistor L2 is connected to the anode of the diode D2. The cathode of the diode D2 is connected to one end of the output capacitor C1. At the connection point between the diode D2 and the output capacitor C1, the output voltage VOUT appears.

A first connection node N1 at which the high-side transistor H1 and the diode D1 are connected together is connected to one end of the coil 20. A second connection node N2 at which the diode D2 and the low-side transistor L2 are connected together is connected to the other end of the coil 20.

The switch controller 152 controls the switching of the high-side transistor H1 and the low-side transistor L2. The switch controller 152 is the agent of the normal and sleep operation described below.

In step-down operation, while the low-side transistor L2 is held off, the high-side transistor H1 is turned on and off repeatedly, in step-up operation, while the high-side transistor H1 is held on, the low-side transistor L2 is turned on and off repeatedly.

In this embodiment, sleep operation includes first sleep operation and second sleep operation, the latter being performed after the former. In step-down or step-up operation under a light-load condition, when the switch controller 152 detects a zero cross in the coil current IL, it effects a transition to the first sleep operation and turns the upper and lower transistors H1 and L2 both off (FIG. 15). Thus, even when zero cross detection is early and the coil current IL remains in the positive direction, the coil current IL flows via the diode D1, the coil 20, and the diode D2, and is regenerated to the output voltage VOUT side. This helps suppress power loss.

Figure 16:
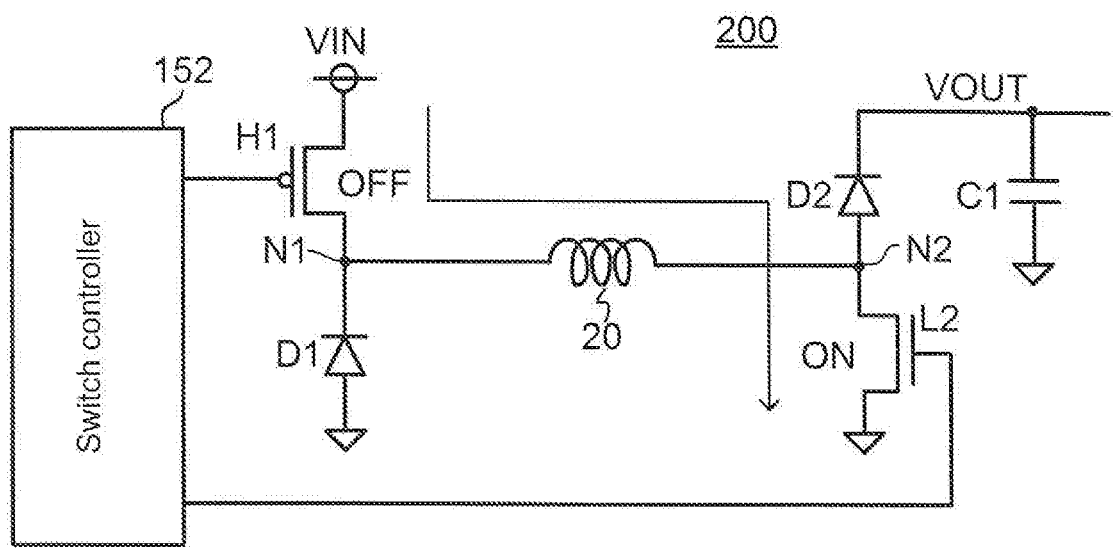
FIG. 16 is a diagram showing a switching pattern in second sleep operation in a diode-rectifying step-up/down DC-DC converter.

After the first sleep operation, a transition is made to the second sleep operation, where, as shown in FIG. 16, the high-side transistor H1 is held off and the low-side transistor L2 is held on. Thus, as indicated by a solid-line arrow in FIG. 16, even if a leak current that flows from the input voltage VIN via the high-side transistor H1 occurs, the leak current flows via the low-side transistor L2 to the ground side. This helps avoid a rise in the output voltage VOUT.

Instead, in the first sleep operation, the low-side transistor L2 may be held off, and the high-side transistor H1 may be held off when VIN>VOUT and on when VIN<VOUT.

In the configuration of the step-up/down DC-DC converter 200, the diode D1 may be replaced with a low-side transistor L1. In that case, in step-down operation, the low-side transistor L2 is held off, and the high-side transistor H1 and the low-side transistor L1 are switched complimentarily. In step-up operation, while the high-side transistor H1 is held on, the low-side transistor L2 is turned on and off.

In this configuration, in the first sleep operation, all the transistors are held off. Thus, even when zero cross detection is early and the coil current IL remains in the positive direction, the coil current IL flows via the body diode of the low-side transistor L1, which is now off, the coil 20, and the diode D2, and is regenerated to the output voltage VOUT side. In the second sleep operation, the high-side transistor H1 is held off, and at least one of the low-side transistors L1 and L2 is held on. Thus, a leak current flows to ground, and this helps avoid a rise in the output voltage VOUT.

In the configuration of the step-up/down DC-DC converter 200, the diode D2 may be replaced with a high-side transistor H2. In that case, in step-down operation, the low-side transistor L2 is held off, the high-side transistor H2 is held on, and the high-side transistor H1 is turned on and off. In step-up operation, while the high-side transistor H1 is held on, the high-side transistor H2 and the low-side transistor L2 are switched complementarily.

In this configuration, in the first sleep operation, all the transistors are held off. Thus, even when zero cross detection is early and the coil current IL remains in the positive direction, the coil current IL flows via the diode D1, the coil 20, and the body diode of the high-side transistor H2, which is now off, and is regenerated to the output voltage VOUT side. In the second sleep operation, the high-side transistor H1 is held off, and the low-side transistor L2 is held on. Thus, a leak current flows to ground, and this helps avoid a rise in the output voltage VOUT.

2. Second Embodiment

Next, a second embodiment of the present invention will be described.

Figure 17:
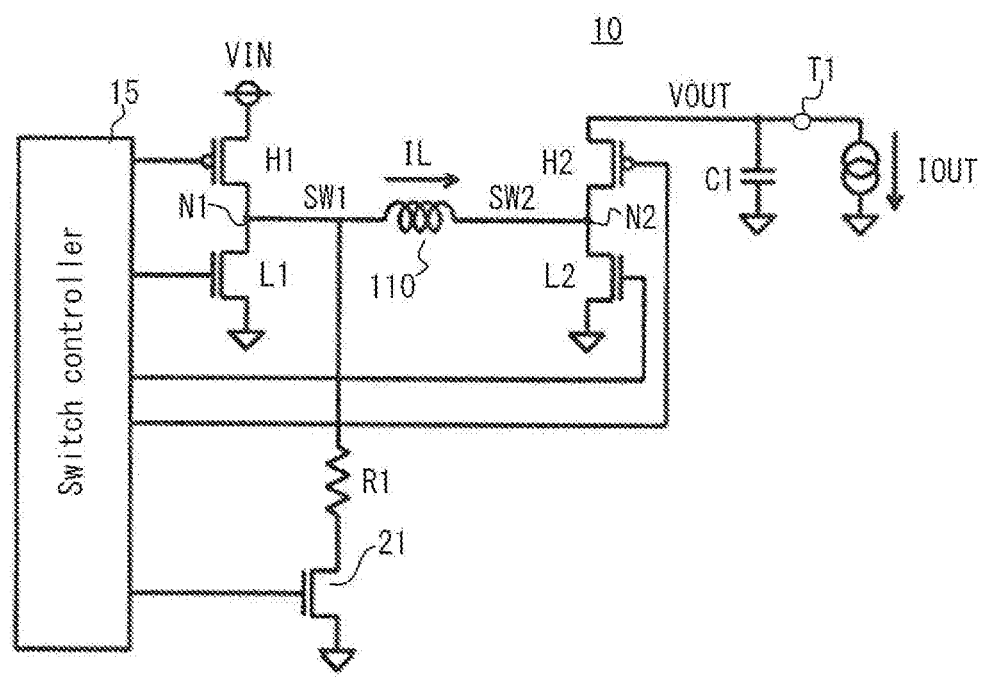
FIG. 17 is a circuit diagram showing a configuration of a step-up/down DC-DC converter according to one embodiment of the present invention.

2-1. Configuration of Step-Up/Down DC-DC Converter:

FIG. 17 is a diagram showing a configuration of a step-up/down DC-DC converter 10 according to one embodiment of the present invention. The step-up/down DC-DC converter 10 shown in FIG. 17, compared with a configuration similar to that of the step-up/down DC-DC converter 100 shown in FIG. 26 and described earlier, additionally includes a resistor R1 and a switch 21.

Figure 26:
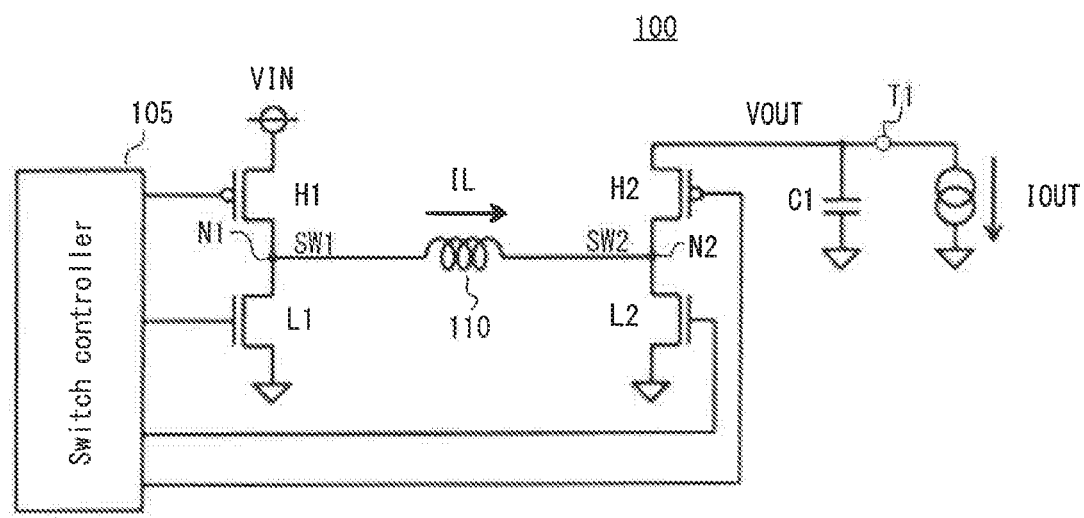
FIG. 26 is a diagram showing a configuration of a step-up/down DC-DC converter according to a conventional example.
Figure 27:
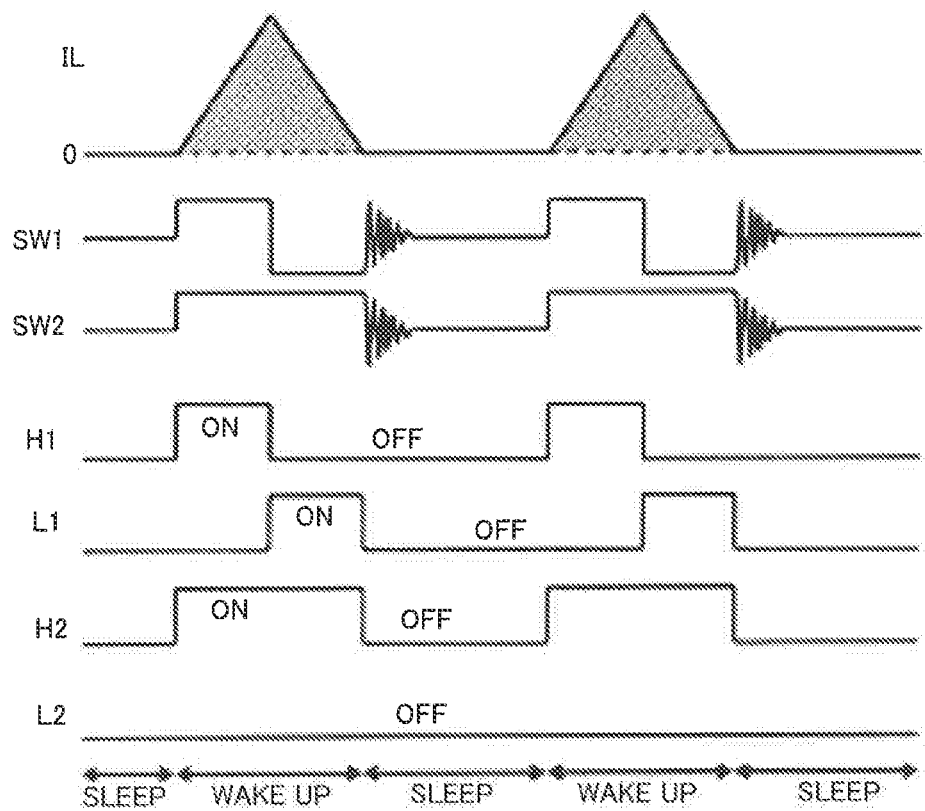
FIG. 27 is a timing chart showing an example of sleep operation in a step-up/down DC-DC converter according to a conventional example.
Figure 28:
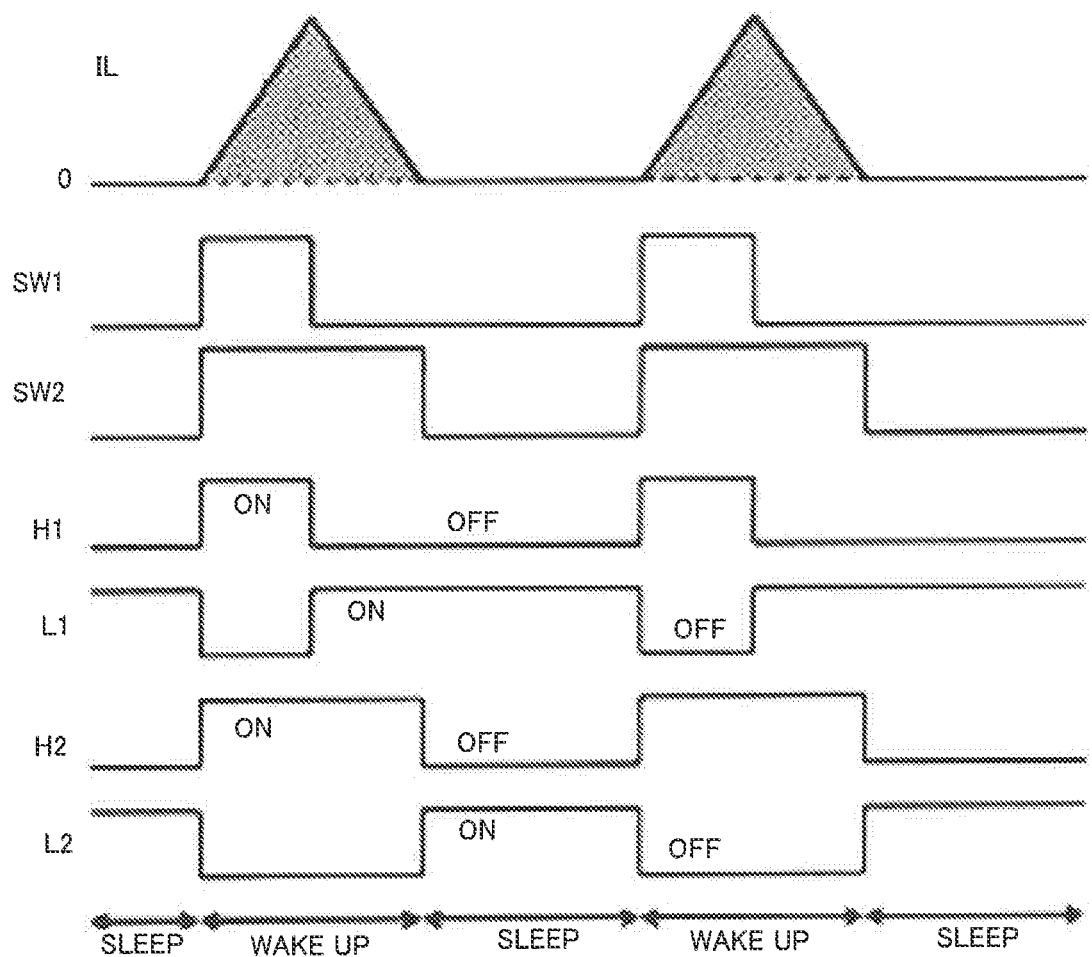
FIG. 28 is a timing chart showing another example of sleep operation in a step-up/down DC-DC converter according to a conventional example.

In the step-up/down DC-DC converter 10, the part composed of a first high-side transistor H1, a first low-side transistor L1, a second high-side transistor H2, a second low-side transistor L2, a coil 110, an output capacitor C1, and an output terminal T1 is similar to the corresponding part in FIG. 26, and therefore no detailed description of this part will be repeated.

A configuration around the resistor R1 and the switch 21 will now be described specifically. To the first connection node N1, one end of the resistor R1 is connected. The other end of the resistor R1 is connected to the drain of the switch 21, which is an n-channel MOSFET. The source of the switch 21 is connected to ground. That is, the first connection node N1 is pulled down to ground.

The step-up/down DC-DC converter 10 includes a switch controller 15. The switch controller 15 controls the on/off states of the high-side and low-side transistors, and also controls the on/off state of the switch 21. The switch controller 15 is the agent that performs the sleep operation described below. The switch controller 15 also performs zero cross detection in the coil current IL.

Figure 18:
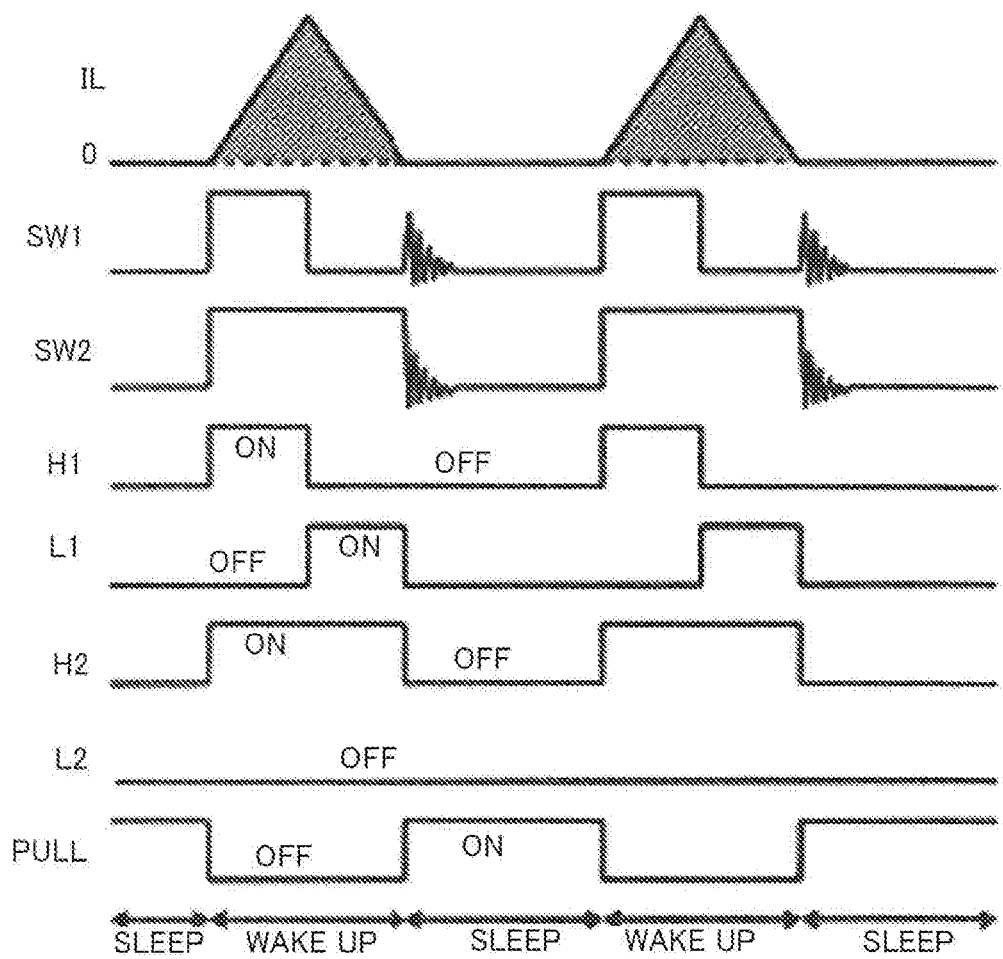
FIG. 18 is a timing chart showing an example of control performed, in step-down operation with a light load, to shift from normal operation to sleep operation according to one embodiment of the present invention.

2-2. Sleep Operation of 1st Embodiment: Here, sleep operation according to a first embodiment that is performed in the step-up/down DC-DC converter 10 will be described. FIG. 18 is a timing chart showing an example of control performed, in step-down operation with a light load, to shift from normal operation to sleep operation according to the first embodiment. FIG. 18 depicts, from the topmost row down, the coil current IL, the voltage appearing at the first connection node N1 referred to as the first switching voltage SW1, the voltage appearing at the second connection node N2 referred to as the second switching voltage SW2, the on/off state of the first high-side transistor H1, the on/off state of the first low-side transistor L1, the on/off state of the second high-side transistor H2, and the on/off state of the second low-side transistor L2, depicting, in the bottommost row, the on/off state of the switch 21.

As shown in FIG. 18, in this embodiment, in normal operation (WAKE UP), while the second high-side transistor H2 is held on and the second low-side transistor L2 is held off, the first high-side transistor H1 and the first low-side transistor L1 are switched complementarily. Meanwhile, the switch 21 is held off. In normal operation, the coil current IL increases and decreases, and when a zero cross in the coil current IL is detected, shifting from normal operation to sleep operation (SLEEP) takes place.

On transition to sleep operation, the high-side and low-side transistors in the step-up/down DC-DC converter 10 are all turned off, and the switch 21 is turned on. The switching pattern at this time is shown in FIG. 19.

Figure 19:
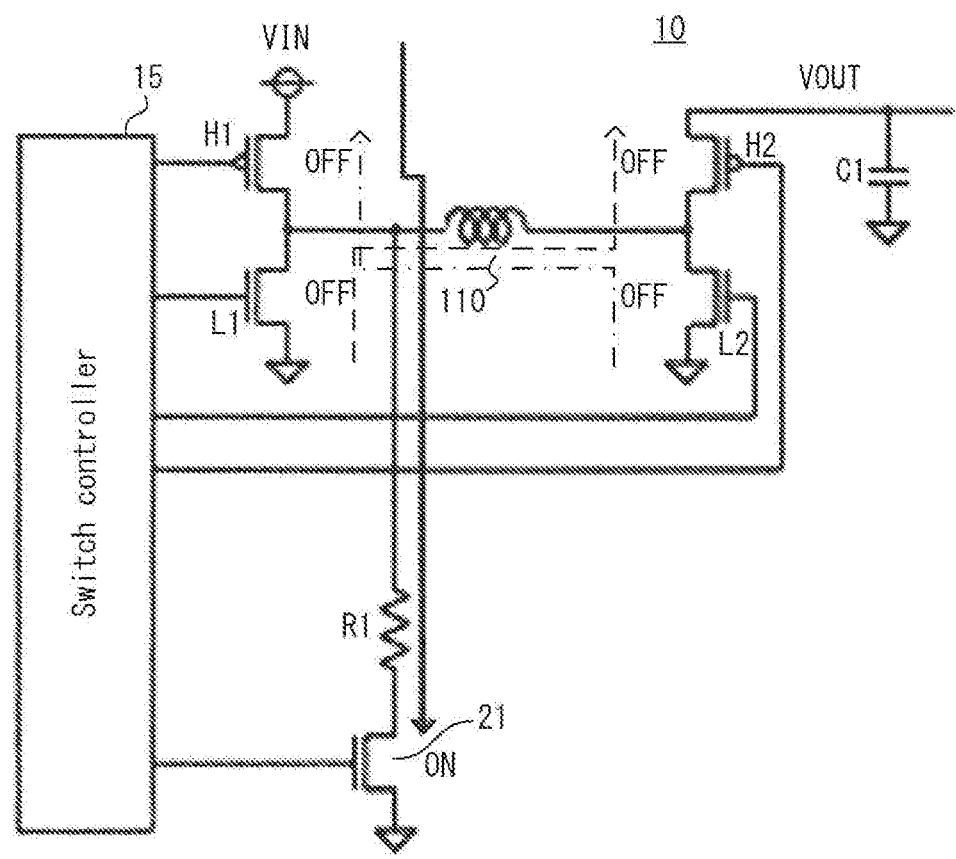
FIG. 19 is a diagram showing a switching pattern in sleep operation according to one embodiment.

Here, when zero cross detection is early, and a positive-direction coil current IL remains, then, as indicated by a broken-line arrow in FIG. 19, the coil current IL flows along a path via the body diode of the first low-side transistor L1, the coil 110, and the body diode of the second high-side transistor H2 in this order, and is regenerated to the output voltage VOUT side. On the other hand, when zero cross detection is late, and a negative-direction coil current IL remains, then, as indicated by a dash-dot-line arrow in FIG. 19, the coil current IL flows along a path via the body diode of the second low-side transistor L2, the coil 110, and the body diode of the first high-side transistor H1 in this order, and is regenerated to the input voltage VIN side.

In this way, no matter in which direction zero cross detection deviates, the current is regenerated to the output voltage VOUT side or to the input voltage VIN side, and this helps suppress power loss.

Moreover, here, as indicated by a solid-line arrow in FIG. 19, if a leak current flows from the input voltage VIN side via the first high-side transistor H1, the leak current flows via the first connection node, the resistor R1, and the switch 21 to ground. This helps avoid a rise in the output voltage VOUT resulting from the leak current flowing to the output voltage VOUT side.

A small resistance value in the resistor R1 causes part of the coil current IL to flow via the resistor R1, leading to power loss. However, the resistor R1 may be given a significantly high resistance value so long as it can absorb a leak current; so long as the voltage value calculated by multiplying the leak current by the resistance value of the resistor R1 is lower than the output voltage VOUT, the output voltage VOUT exhibits no rise.

As described above, by performing the sleep operation according to this embodiment, even if zero cross detection in the coil current IL deviates, it is possible to suppress power loss, and to suppress a rise in the output voltage VOUT due to the leak current.

Figure 20:
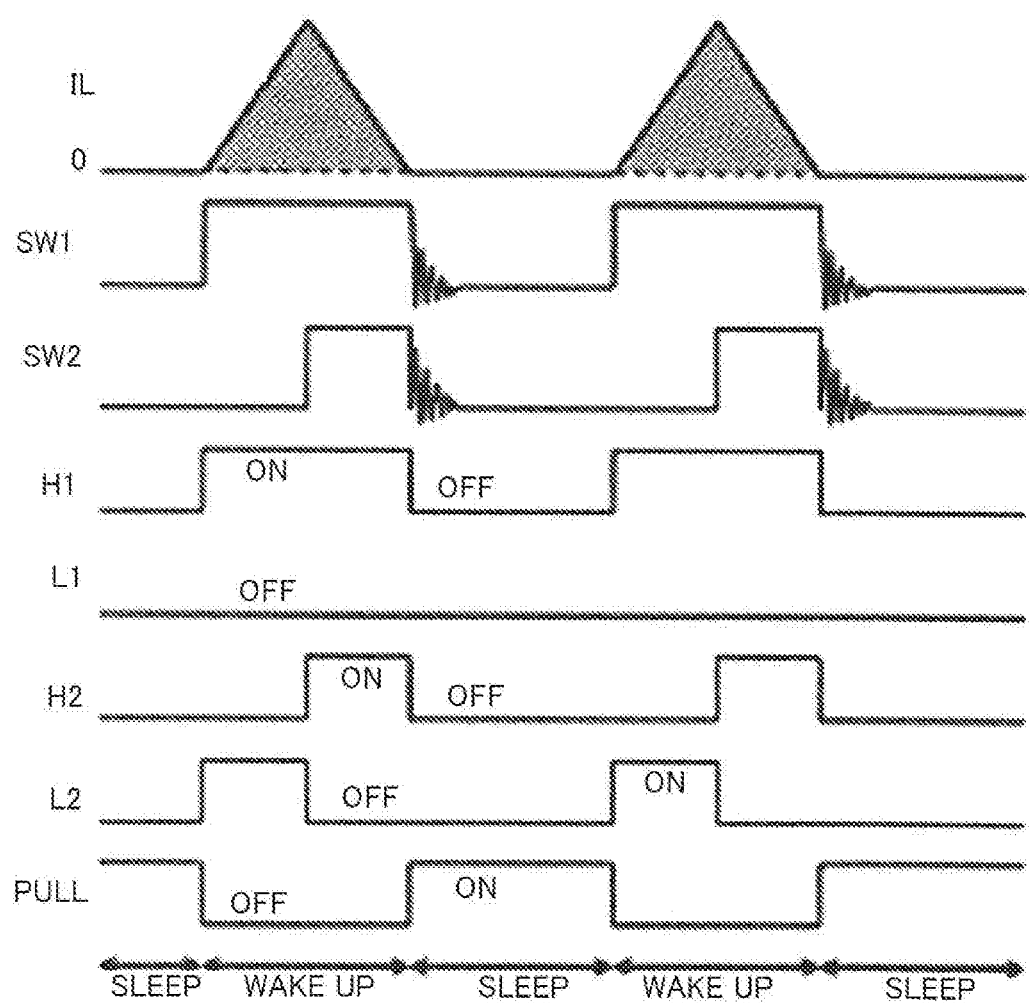
FIG. 20 is a timing chart showing an example of control performed, in step-up operation with a light load, to shift from normal operation to sleep operation according to one embodiment of the present invention.

As shown in FIG. 20, also in step-up operation with a light load, sleep operation similar to that in step-down operation described above can be performed. That is, according to this embodiment, irrespective of which of the input voltage VIN and the output voltage VOUT is higher, similar sleep operation can be performed, and similar effects can obtained.

Figure 21:
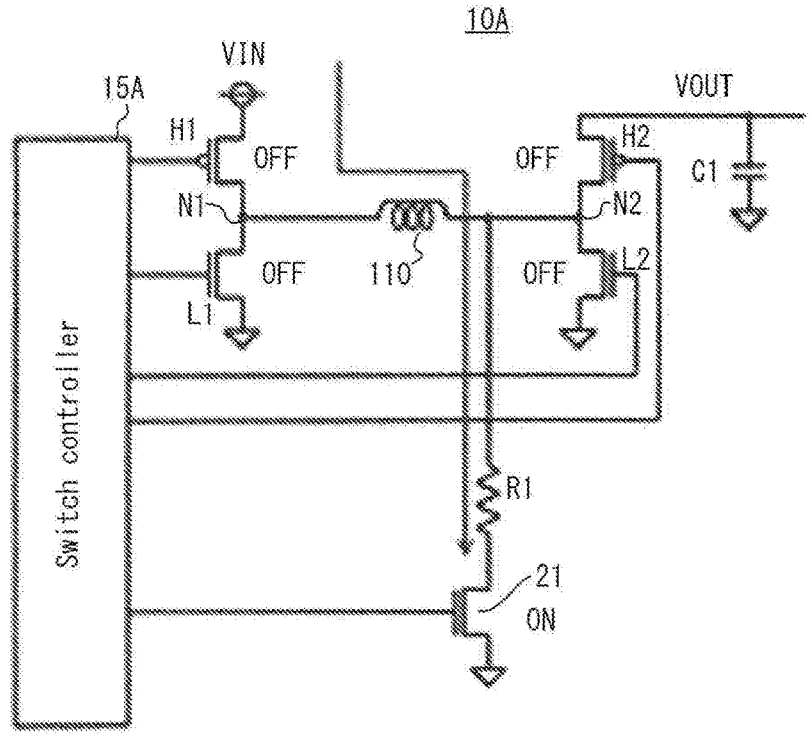
FIG. 21 is a diagram showing a switching pattern in sleep operation in a step-up/down DC-DC converter according to a first modified example of the present invention.

2-3. Modified Examples of Configuration of Step-Up/Down DC-DC Converter: FIG. 21 is a diagram showing a configuration of a step-up/down DC-DC converter according to a first modified example. A difference of the configuration of the step-up/down DC-DC converter 10A shown in FIG. 21 from the configuration shown in FIG. 17 and described previously is that one end of the resistor R1 is connected to the second connection node N2. That is, in the configuration here, the second connection node N2 is pulled down. The step-up/down DC-DC converter 10A includes a switch controller 15A which controls the on/off states of the high-side and low-side transistors, and also controls the on/off state of the switch 21.

Also with the step-up/down DC-DC converter 10A configured as described above, sleep operation similar to the sleep operation according to the first embodiment described previously can be performed. That is, on transition to sleep operation, as shown in FIG. 21, the high-side and low-side transistors are all turned off, and the switch 21 is turned on.

Thus, as indicated by an arrow in FIG. 21, a leak current that flows from the input voltage VIN side via the first high-side transistor H1 flows via the coil 110, the resistor R1, and the switch 21 to ground. This helps avoid a rise in the output voltage VOUT due to the leak current.

Figure 22:
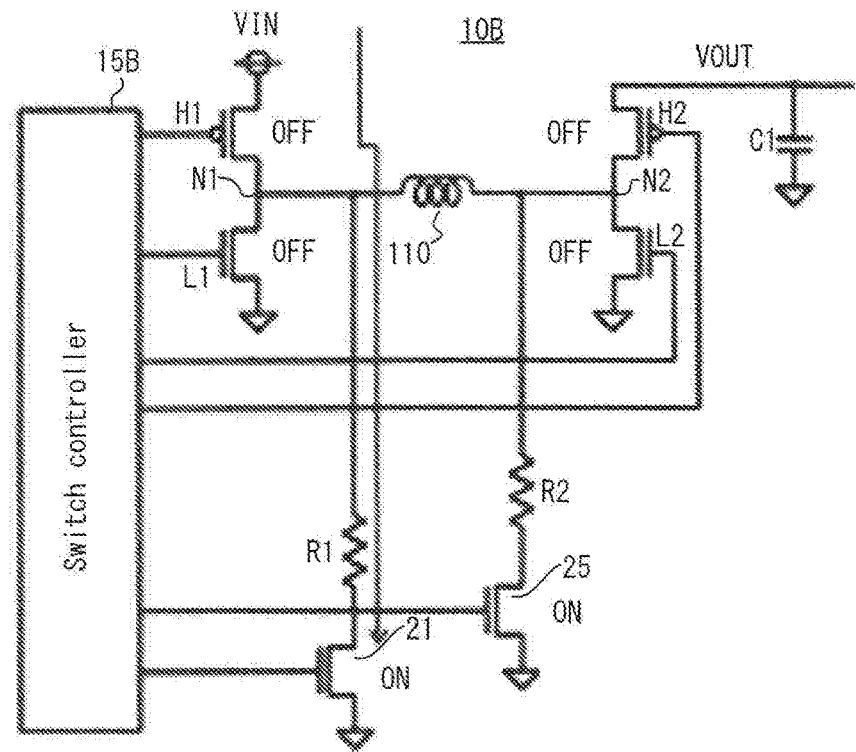
FIG. 22 is a diagram showing a switching pattern in sleep operation in a step-up/down DC-DC converter according to a second modified example of the present invention.

FIG. 22 is a diagram showing a configuration of a step-up/down DC-DC converter according to a second modified example. In the configuration of the step-up/down DC-DC converter 10B shown in FIG. 22, between the first connection node N1 and ground, a resistor R1 and a switch 21 are provided, and, between the second connection node N2 and ground, a resistor R2 and a switch 25 are provided. That is, both of the first and second connection nodes N1 and N2 are pulled down.

Also with the step-up/down DC-DC converter 10B configured as described above, sleep operation similar to the sleep operation according to the first embodiment described previously can be performed. That is, on transition to sleep operation, as shown in FIG. 22, the high-side and low-side transistors are all turned off, and the switches 21 and 25 are both turned on.

Thus, as indicated by an arrow in FIG. 22, a leak current that flows from the input voltage VIN side via the first high-side transistor H1 flows via the resistor R1 and the switch 21 to ground. This helps avoid a rise in the output voltage VOUT due to the leak current.

2-4. Sleep Operation of 2nd Embodiment: Next, sleep operation according to a second embodiment that is performed in the step-up/down DC-DC converter 10 shown in FIG. 17 and described previously will be described.

Figure 23:
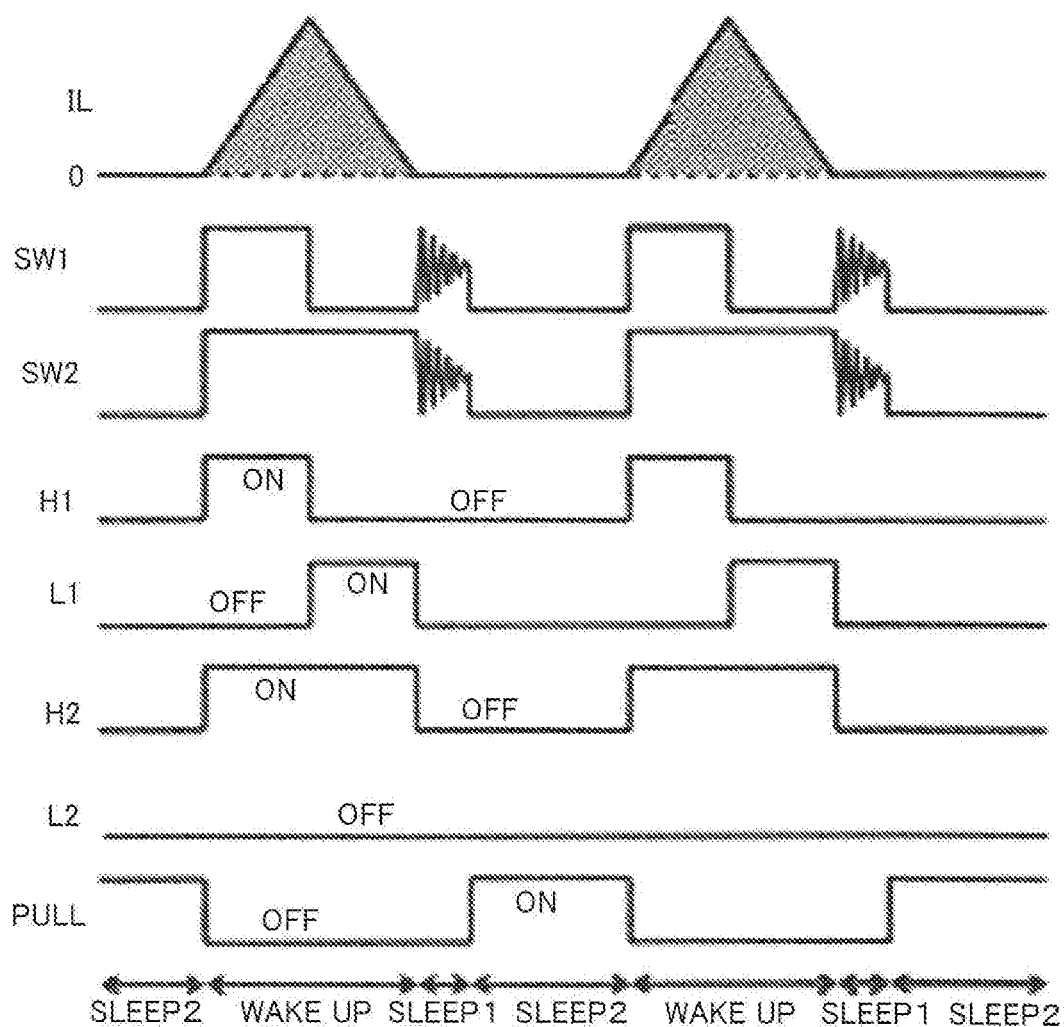
FIG. 23 is a timing chart showing an example of control performed, in step-down operation with a light load, to shift from normal operation to sleep operation according to another embodiment of the present invention.

FIG. 23 is a timing chart showing an example of control performed, in step-down operation with a light load, to shift from normal operation to sleep operation according to the second embodiment. In this embodiment, sleep operation includes first sleep operation and second sleep operation, the latter being performed after the former.

As shown in FIG. 23, in normal operation (WAKE UP), a positive-direction coil current IL increases and decreases, and when a zero cross is detected in the coil current IL, first a transition is made to the first sleep operation (SLEEP1). In the first sleep operation, the high-side and low-side transistors are all turned off, and the switch 21 is turned off.

At this time, as shown also in FIG. 19 referred to previously, no matter whether zero cross detection is early or late (no matter in which direction the coil current IL flows), the coil current IL flows via the body diode of any transistor that is off, and is regenerated to the output voltage VOUT side or to the input voltage VIN side. However, in the first sleep operation according to this embodiment, the switch 21 in FIG. 19 is held off; this prevents part of the coil current IL from flowing via the resistor R1, and helps suppress power loss.

At the lapse of a predetermined period from the transition to the first sleep operation, as shown in FIG. 23, a transition to the second sleep operation takes place. It is preferable that the predetermined period be set to be the length of time required for the coil current IL regenerated in the first sleep operation to reduce to zero.

In the second sleep operation, the high-side and low-side transistors are all turned off, and the switch 21 is turned on. Thus, a switching pattern similar to that shown in FIG. 19 results; as indicated by a solid-line arrow in FIG. 19, if a leak current flows from the input voltage VIN side via the first high-side transistor H1, the leak current flows via the resistor R1 and the switch 21 to ground. This helps avoid a rise in the output voltage VOUT resulting from the leak current flowing to the output voltage VOUT side.

In the configuration of the step-up/down DC-DC converter 10 shown in FIG. 17, the resistor R1 and the switch 21 may be omitted. In that case, in the second sleep operation, the high-side transistors can both be held off and at least one of the low-side transistors can be held on; also this permits the leak current to flow via the low-side transistor or transistors to ground.

Inconveniently, since a low-side transistor has a low on-resistance, if a short circuit occurs between the drain and source of the first high-side transistor H1, a short-circuit path from the input voltage VIN side to ground forms, possibly causing an overcurrent. By contrast, according to this embodiment, even if a short circuit occurs between the drain and source of the first high-side transistor H1, a current flows via the resistor R1 to ground; the current is thus limited by the resistor R1, and this helps suppress an overcurrent.

Figure 24:
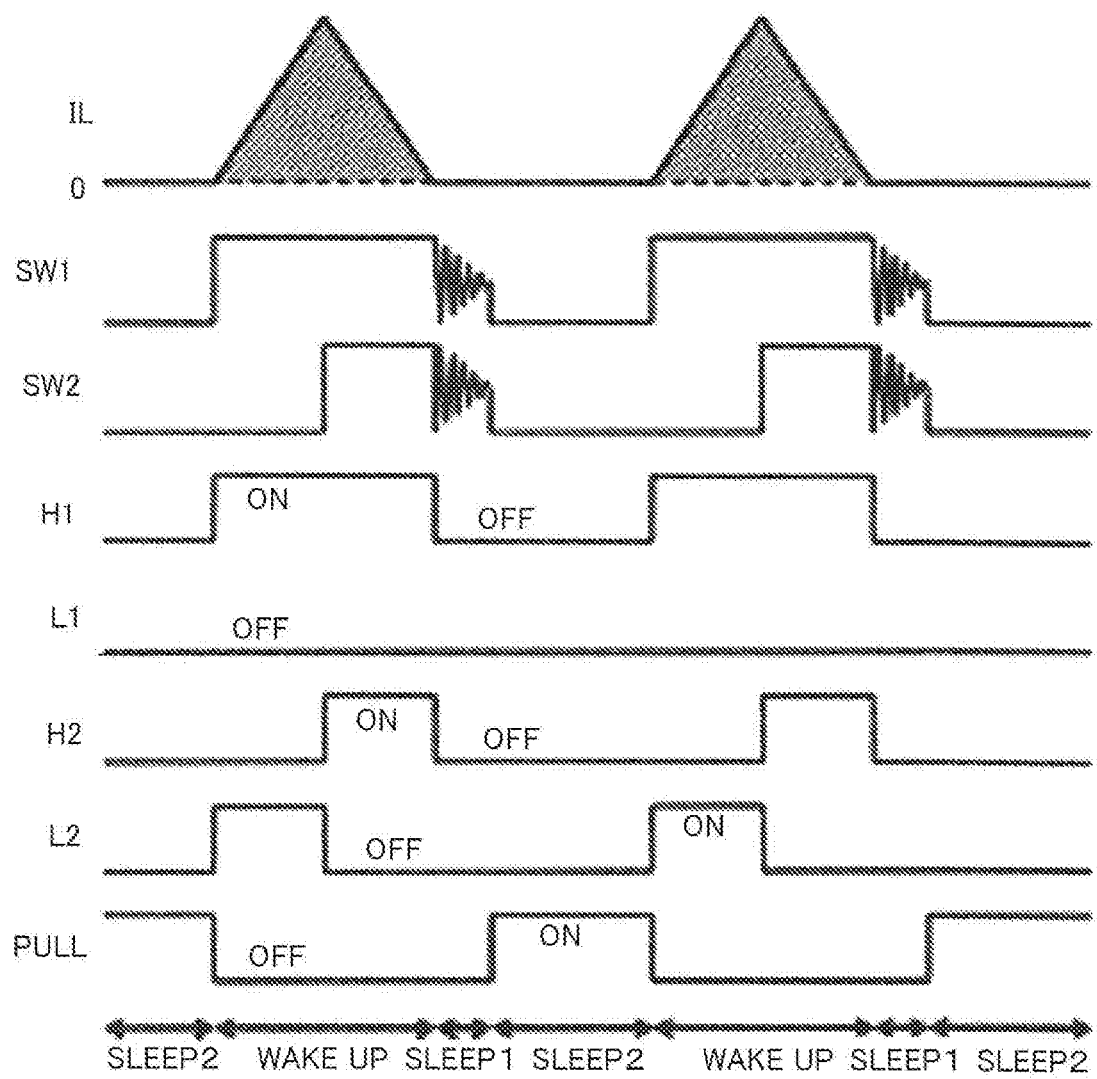
FIG. 24 is a timing chart showing an example of control performed, in step-up operation with a light load, to shift from normal operation to sleep operation according to another embodiment of the present invention.

As shown in FIG. 24, also in step-up operation with a light load, through switching control similar to that in step-down operation shown in FIG. 23 and described previously, first and second sleep operation is performed.

The sleep operation according to this embodiment, which is performed in two stages of first and second sleep operation, can be applied not only to the step-up/down DC-DC converter configured as shown in FIG. 17 but also to the step-up/down DC-DC converter configured as shown in FIG. 21 or FIG. 22.

Specifically, in the case of the step-up/down DC-DC converter 10A configured as shown in FIG. 21, the switch 21 connected to the second connection node N2 is held off in the first sleep operation and on in the second sleep operation. In the case of the step-up/down DC-DC converter 10B configured as shown in FIG. 22, the switch 21 connected to the first connection node N1 and the switch 25 connected to the second connection node N2 are both held off in the first sleep operation and on in the second sleep operation.

In this way, no matter with which of the configurations of FIGS. 21 and 22, through the first sleep operation, it is possible, when zero cross detection in coil current IL deviates, to regenerate the current while preventing part of the coil current IL from flowing via a resistor; through the second sleep operation, it is possible to pass a leak current to ground and to avoid a rise in the output voltage VOUT due to the leak current.

Figure 25:
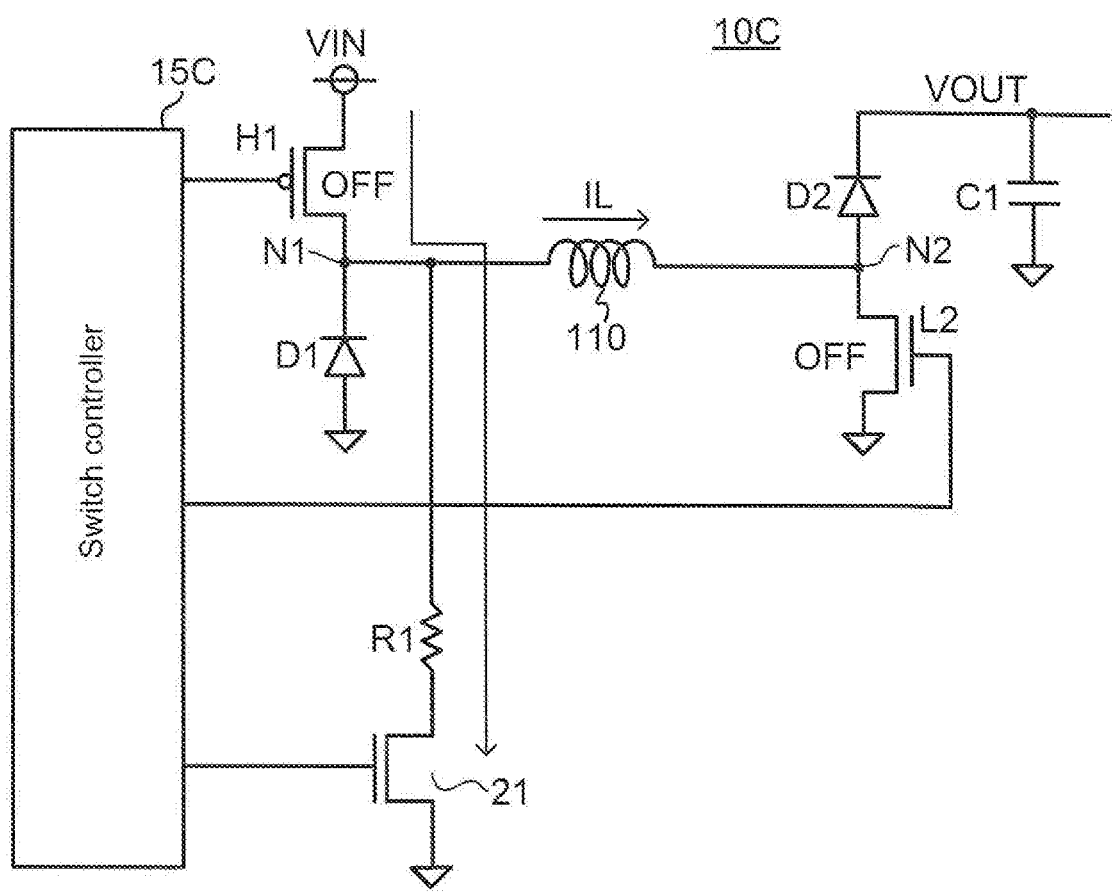
FIG. 25 is a circuit diagram showing a configuration of a diode-rectifying step-up/down DC-DC converter according to one embodiment of the present invention.

2-5. Diode-Rectifying Step-Up/Down DC-DC Converter:

Here, an embodiment employing a diode-rectifying step-up/down DC-DC converter will be described. FIG. 25 is a diagram showing a configuration of a diode-rectifying step-up/down DC-DC converter 10C according to one embodiment of the present invention. The step-up/down DC-DC converter 10C includes a high-side transistor H1, a diode D1, a coil 110, a diode D2, a low-side transistor L2, an output capacitor C1, a resistor R1, a switch 21, and a switch controller 15C.

The source of the high-side transistor H1 is connected to a terminal to which the input voltage VIN is applied. The drain of the high-side transistor H1 is connected to the cathode of the diode D1. The anode of the diode D1 is connected to ground.

The source of the low-side transistor L2 is connected to ground. The drain of the low-side transistor L2 is connected to the anode of the diode D2. The cathode of the diode D2 is connected to one end of the output capacitor C1. At the connection point between the diode D2 and the output capacitor C1, the output voltage VOUT appears.

A first connection node N1 at which the high-side transistor H1 and the diode D1 are connected together is connected to one end of the coil 110. A second connection node N2 at which the diode D2 and the low-side transistor L2 are connected together is connected to the other end of the coil 110.

The resistor R1 and the switch 21 are connected between the first connection node N1 and ground.

The switch controller 15C controls the switching of the high-side transistor H1, the low-side transistor L2, and the switch 21. The switch controller 15C is the agent that controls the normal and sleep operation described below.

In step-down operation, while the low-side transistor L2 is held off, the high-side transistor H1 is turned on and off repeatedly. In step-up operation, while the high-side transistor H1 is held on, the low-side transistor L2 is turned on and off repeatedly. In step-up and step-down operation, the switch 21 is held off.

In step-up or step-down operation under a light-load condition, when the switch controller 15C detects a zero cross in the coil current IL, it effects a transition to sleep operation and turns the upper and lower transistors H1 and L2 both off (FIG. 25). Thus, even if zero cross detection is early and the coil current IL remains in the positive direction, the coil current IL flows via the diode D1, the coil 110, and the diode D2, and is regenerated to the output voltage VOUT side. This helps suppress power loss.

At this time, the switch 21 is turned on. Thus, as indicated by a solid-line arrow in FIG. 25, even if a leak current that flows from the input voltage VIN side via the high-side transistor H1 occurs, the leak current flows via the resistor R1 and the switch 21 to ground side. This helps avoid a rise in the output voltage VOUT.

Sleep operation may be performed in two stages of first and second sleep operation. In that case, in the first sleep operation, the switch 21 is held off, and the upper and lower transistors H1 and L2 are both held off. This helps prevent part of the coil current IL from flowing to ground. In the second sleep operation, while the upper and lower transistors H1 and L2 are both held off, the switch 21 is held on.

In the step-up/down DC-DC converter 10C described above, the combination of a resistor and a switch may be connected to, instead of the first connection node N1 side, the second connection node N2 side, or two such combinations may be provided to be connected the two connection nodes respectively.

In the configuration of the step-up/down DC-DC converter 10C, the diode D1 may be replaced with a low-side transistor L1. In that case, in sleep operation, the high-side transistor H1, the low-side transistor L1, and the low-side transistor L2 are all held off. Thus, even when zero cross detection is early and the coil current IL remains in the positive direction, the coil current IL flows via the body diode of the low-side transistor L1, which is now off, the coil 110, and the diode D2, and is regenerated to the output voltage VOUT side.

In the configuration of the step-up/down DC-DC converter 10C, the diode D2 may be replaced with a high-side transistor H2. In that case, in sleep operation, the high-side transistor H1, the high-side transistor H2, and the low-side transistor L2 are all held off. Thus, even when zero cross detection is early and the coil current IL remains in the positive direction, the coil current IL flows via the diode D1, the coil 110, and the body diode of the high-side transistor H2, which is now off, and is regenerated to the output voltage VOUT side.

3. Modifications etc.: While the present invention has been described above by way of embodiments, it may be implemented in any manner other than as in the embodiments above and allows of many modifications without departure from the spirit of the present invention. That is, the embodiments above should be considered in every aspect illustrative and not restrictive. It should be understood that the technical scope of the present invention is defined not by the description of the embodiment above but by the appended claims and encompasses any modifications made in the sense and scope equivalent to those of the claims.

What is claimed is:

1. A step-up/down DC-DC converter comprising:
    a step-down switch set including a connected arrangement of a first high-side transistor and a first rectifying element, the step-down switch set having an input voltage applied thereto;
    a step-up switch set including a connected arrangement of a second rectifying element and a second low-side transistor, the step-up switch set outputting an output voltage through the second rectifying element;
    a coil connecting between a first connection node in the step-down switch set and a second connection node in the step-up switch set;
    a resistor and a switch arranged in a path from at least one of the first and second connection nodes to ground; and
    a switch controller configured to control switching of the transistors in the step-down and step-up switch sets and of the switch,
    wherein the switch controller performs sleep operation, to which a transition from normal operation is made when a light load supplied with the output voltage is detected, in the sleep operation, when the first high-side transistor and the second low-side transistor are off, the switch is held on, and
    the step-up/down DC-DC converter has, in one period, a pattern where the switch is on and the first rectifying element is off and, in another period, a pattern where the switch is off and the first rectifying element is on.

2. The step-up/down DC-DC converter according to claim 1, wherein
    simultaneously with a transition from the normal operation to the sleep operation, the switch is turned on.

3. The step-up/down DC-DC converter according to claim 1, wherein
    the first rectifying element is a first low-side transistor,
    the second rectifying element is a second high-side transistor,
    in the sleep operation, the first high-side transistor, the first low-side transistor, the second high-side transistor, and the second low-side transistor are held off.

4. The step-up/down DC-DC converter according to claim 1, wherein the path of the resistor and the switch leads a leak current from the input voltage side via the first high-side transistor to ground when the switch is turned on in the sleep operation.

5. The step-up/down DC-DC converter according to claim 4, wherein a voltage value calculated by multiplying the leak current by a resistance value of the resistor is lower than the output voltage.

* * * * *